(12) United States Patent
Chen et al.

(10) Patent No.: US 9,116,357 B2
(45) Date of Patent: Aug. 25, 2015

(54) HYBRID MULTIPLEXED 3D DISPLAY AND DISPLAYING METHOD THEREOF

(75) Inventors: Wu-Li Chen, Taipei (TW); Kuo-Chung Huang, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 255 days.

(21) Appl. No.: 13/334,026

(22) Filed: Dec. 21, 2011

(65) Prior Publication Data

US 2012/0092573 A1 Apr. 19, 2012

Related U.S. Application Data

(63) Continuation-in-part of application No. 11/958,422, filed on Dec. 18, 2007, now Pat. No. 8,724,039.

(30) Foreign Application Priority Data

Jun. 23, 2007 (TW) .............................. 96122813 A

(51) Int. Cl.
*G02F 1/1335* (2006.01)
*G02B 27/22* (2006.01)
(Continued)

(52) U.S. Cl.
CPC ........ *G02B 27/2214* (2013.01); *G02B 27/2264* (2013.01); *G09G 3/003* (2013.01); *H04N 13/0404* (2013.01); *H04N 13/045* (2013.01); *H04N 13/0418* (2013.01); *H04N 13/0422* (2013.01); *H04N 13/0447* (2013.01); *G09G 3/20* (2013.01); *H04N 13/0409* (2013.01); *H04N 13/0497* (2013.01)

(58) Field of Classification Search
CPC .................................................. H04N 13/0404

USPC ................ 349/15; 428/42–60; 348/42, 51–52
See application file for complete search history.

(56) References Cited

U.S. PATENT DOCUMENTS

| 1,128,979 A | 2/1915 | Hess |
| 1,992,872 A | 3/1934 | Mahler |

(Continued)

FOREIGN PATENT DOCUMENTS

| CN | 101071535 | 11/2007 |
| TW | 161577 | 6/1991 |

(Continued)

OTHER PUBLICATIONS

Thompson, "Selected Papers on Three-Dimensional Displays", SPIE Milestone Series vol. MS 162, May 31, 2001, p. 1-6.

(Continued)

*Primary Examiner* — Dung Nguyen
(74) *Attorney, Agent, or Firm* — Jianq Chyun IP Office

(57) ABSTRACT

A hybrid multiplexed 3D display including a light source, an image splitter, and an image display is provided. The light source is used for sequentially providing a plurality of groups of light emitting toward different emitting directions. The image splitter is disposed above the light source for imaging each of the groups of light at a view group comprising a plurality of views. The image display is disposed above the light source for providing image data. The groups of light are sequentially transmitted through the image display and the image splitter to respectively generate a plurality of view images at the views such that an image viewed by a user includes at least two of the view images to achieve a stereoscopic visual effect.

11 Claims, 20 Drawing Sheets

(51) Int. Cl.
 *G09G 3/00* (2006.01)
 *H04N 13/04* (2006.01)
 *G09G 3/20* (2006.01)

(56) References Cited

U.S. PATENT DOCUMENTS

| | | | |
|---|---|---|---|
| 2,631,496 | A | 8/1947 | Rehom |
| 5,132,839 | A | 7/1992 | Travis |
| 5,264,964 | A | 11/1993 | Faris |
| 5,428,366 | A | 6/1995 | Eichenlaub |
| 5,777,588 | A | 7/1998 | Woodgate et al. |
| 5,825,337 | A | 10/1998 | Wiseman et al. |
| 5,831,765 | A | 11/1998 | Nakayama et al. |
| 5,833,507 | A | 11/1998 | Woodgate et al. |
| 5,973,831 | A | 10/1999 | Kleinberger et al. |
| 6,064,424 | A | 5/2000 | van Berkel et al. |
| 6,172,723 | B1 | 1/2001 | Inoue et al. |
| 6,172,807 | B1 * | 1/2001 | Akamatsu ............ 359/462 |
| 6,351,280 | B1 | 2/2002 | Benton |
| 6,715,885 | B2 * | 4/2004 | Hirose et al. ............ 353/69 |
| 6,734,923 | B2 | 5/2004 | Kwon et al. |
| 6,816,207 | B2 | 11/2004 | Jung |
| 7,646,438 | B2 | 1/2010 | Park et al. |
| 7,916,221 | B2 * | 3/2011 | Daiku ............... 349/15 |
| 8,648,792 | B2 * | 2/2014 | Redert et al. ............ 348/51 |
| 8,681,174 | B2 * | 3/2014 | Nam et al. ............ 345/613 |
| 2002/0039229 | A1 | 4/2002 | Hirose et al. |
| 2006/0051109 | A1 | 3/2006 | Lim et al. |
| 2006/0238863 | A1 | 10/2006 | Saishu |
| 2008/0316378 | A1 | 12/2008 | Huang et al. |
| 2012/0026303 | A1 * | 2/2012 | Ezhov ............... 348/54 |

FOREIGN PATENT DOCUMENTS

| | | |
|---|---|---|
| TW | 381394 | 2/2000 |
| TW | 496967 | 8/2002 |
| TW | 200624869 | 7/2006 |
| TW | I275828 | 3/2007 |
| TW | 200900736 | 1/2009 |
| TW | 201044345 | 12/2010 |
| WO | 2004040354 | 5/2004 |

OTHER PUBLICATIONS

Okoshi, "Three-Dimensional Imaging Techniques", Academic Press Inc., Feb. 7, 1977, p. 1-5.

Travis et al., "The design and evaluation of a crt-based autostereoscopic 3-d display", Proceedings of the SID. vol. 32/4, 1991, p. 279-283.

Sugiura et al., "25.4: Six-Primary-Color 23-in WXGA LCD using Six-Color LEDs", SID Symposium Digest of Technical Papers, May 2005, vol. 36, Issue 1, p. 1124-1127.

Javidi et al., "Three-Dimensional Television Video, and Display Technologies", Published by Springer, Oct. 3, 2002, p. 1-11.

Yeung et al., "P-125: Sequential Color LCD Using No-Bias Bend Mode", SID Symposium Digest of Technical Papers, May 2007, vol. 38, Issue 1, p. 677-679.

Surman et al., "A Roadmap for Autostereoscopic Multi-Viewer Domestic TV Displays", 2006 IEEE International Conference on Multimedia and Expo, Jul. 9-12, p. 1693-1696.

Yamaguchi et al., "Introduction of Naatural Vision", Imaging Science and Engineering laboratory, Tokyo Institute of Technology, Jan. 10, 2007, p. 1-14.

"Foundation of the Stereoscopic Cinema: Chapter 2, Stereopsis and Stereoscopy", Lenny Lipton, p. 53-59, Jul. 1982.

"Office Action of Taiwan Counterpart Application", issued on Jan. 18, 2011, p. 1-p. 5.

* cited by examiner

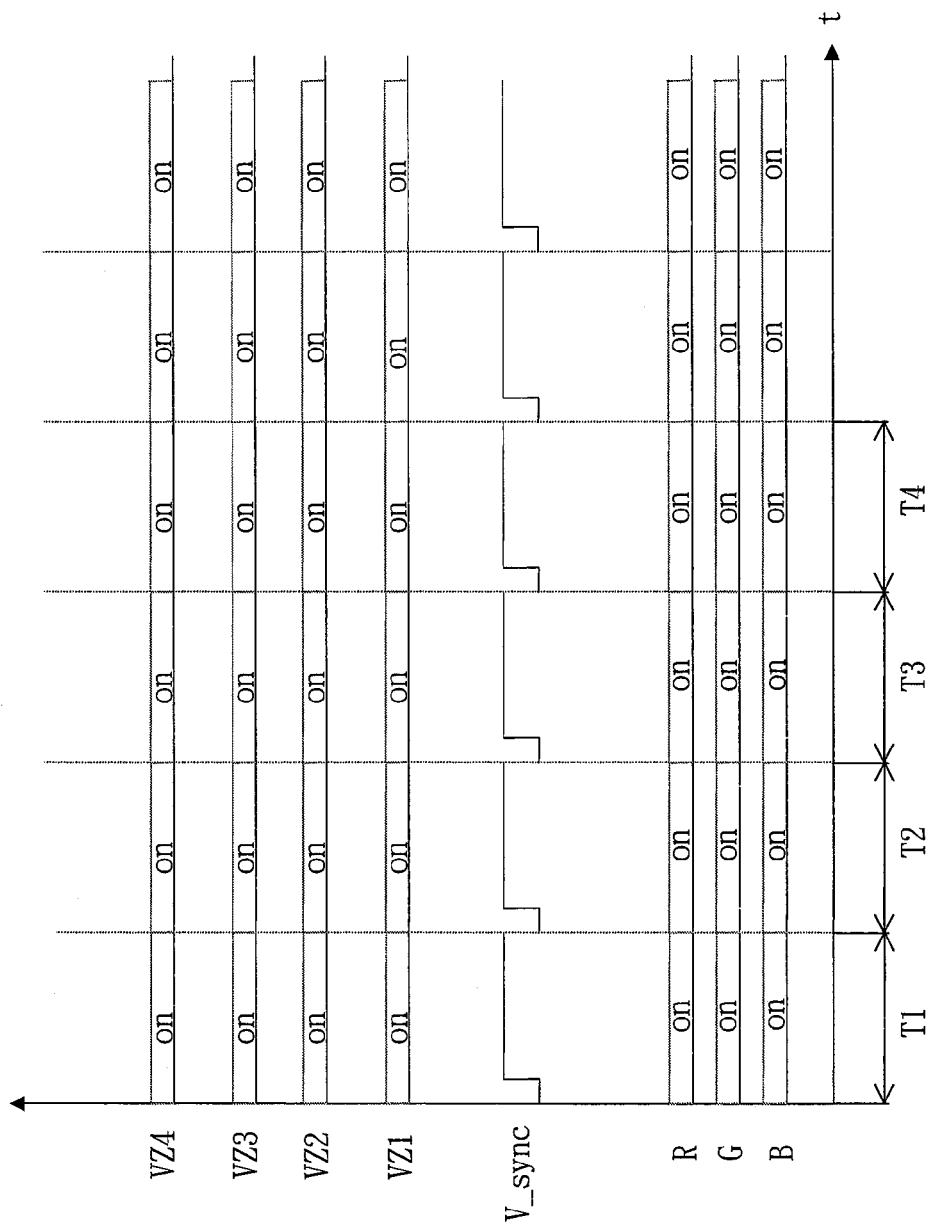
FIG. 6A (RELATED)

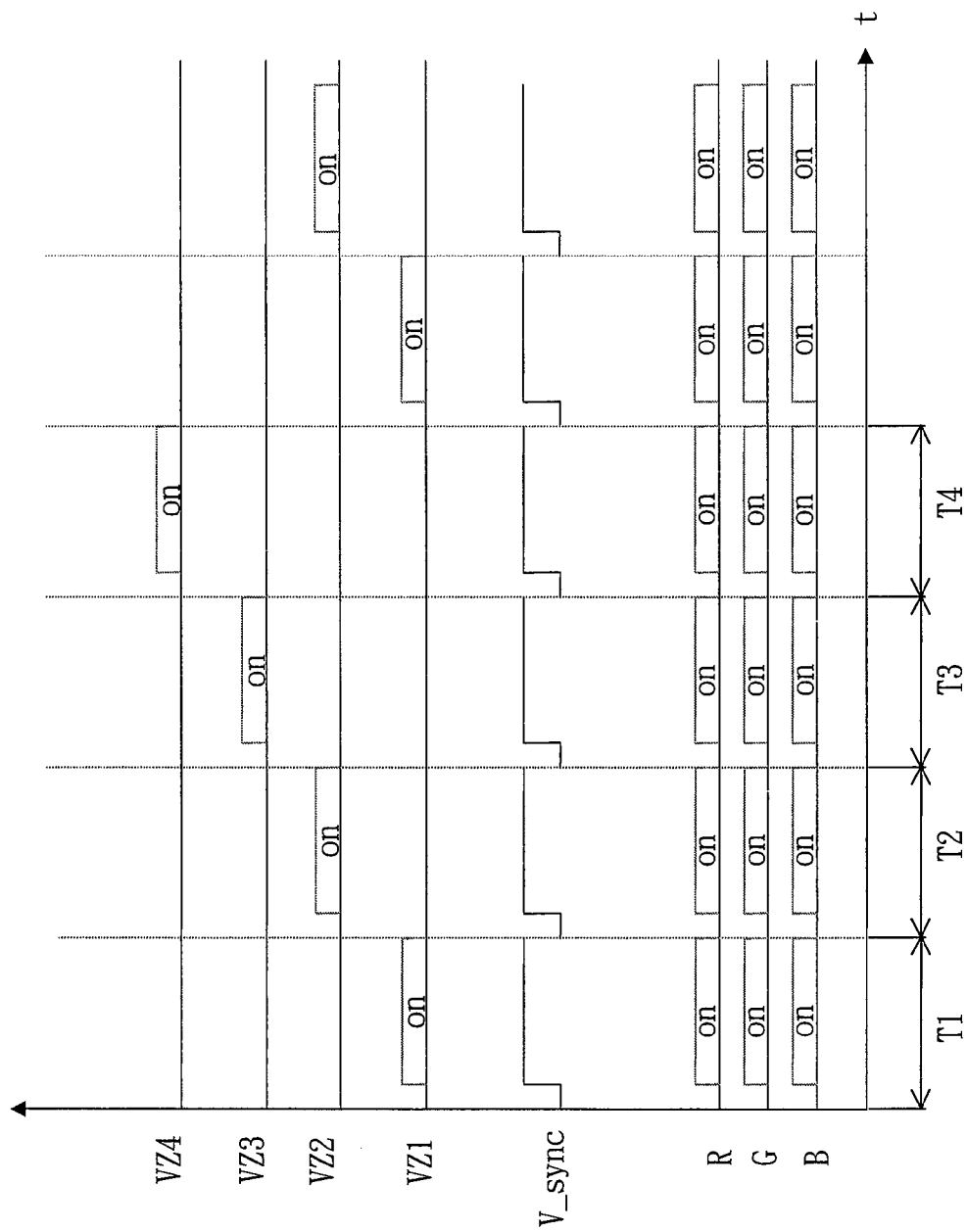
FIG. 6B (RELATED)

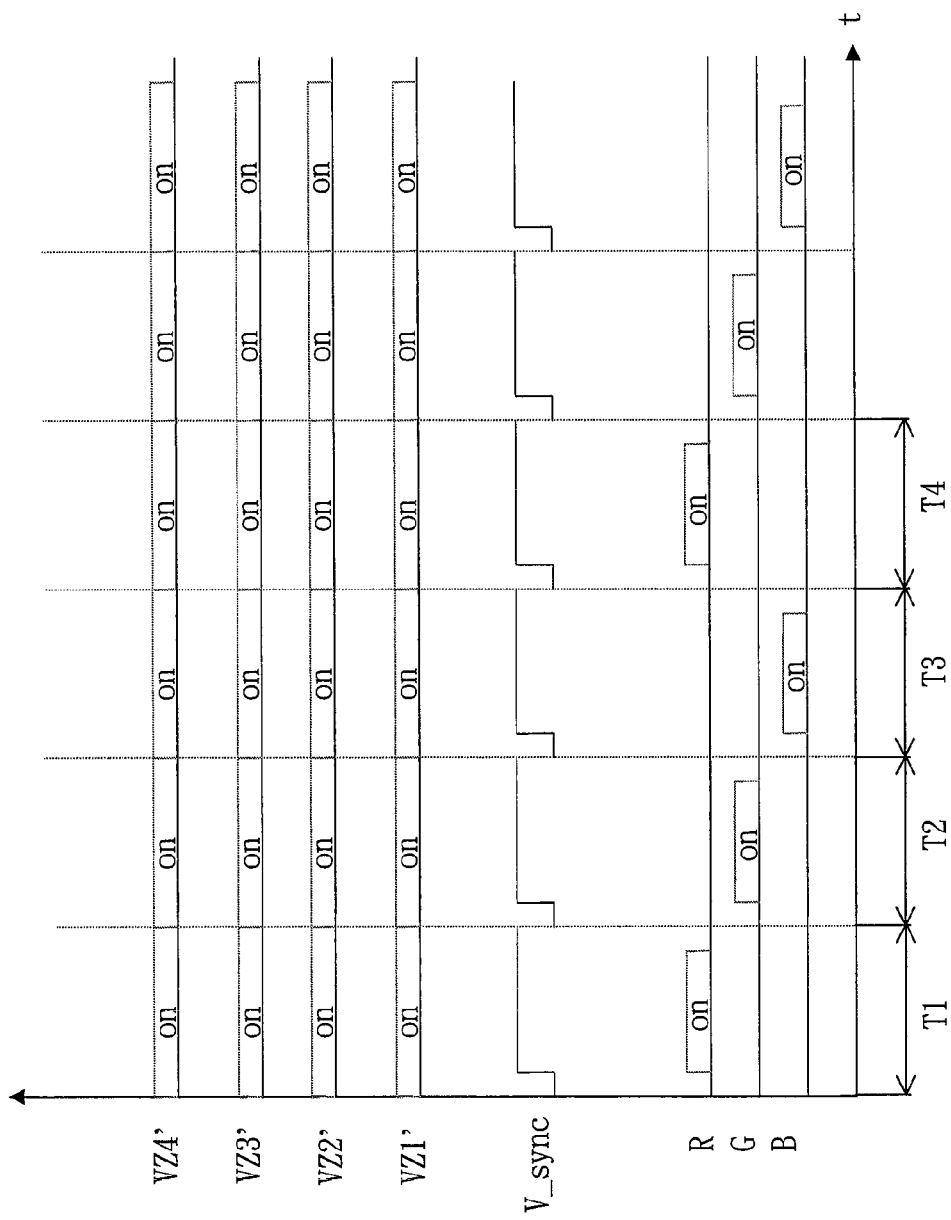
FIG. 6C (RELATED)

HYBRID MULTIPLEXED 3D DISPLAY AND DISPLAYING METHOD THEREOF

This application is a continuation-in-part of and claims the priority benefit of U.S. application Ser. No. 11/958,422, filed on Dec. 18, 2007, now pending, which claims the priority benefit of Taiwan Application Serial Number 96122813, filed Jun. 23, 2007. The entirety of the above-mentioned patent applications is hereby incorporated by reference herein and made a part of this specification.

TECHNICAL FIELD

The technical field relates in general to a 3D display and a displaying method thereof, and more particularly to a hybrid multiplexed 3D display and a displaying method thereof.

BACKGROUND

A display has become a most-important interface between the human and the technology. The technology of displaying a frame has been advanced toward the high resolution, the high image quality and the large scale. The next revolutionary advance of the display technology corresponds to the 3D image display converted from the 2D image display so as to satisfy the most important and natural stereoscopic visual effect in the human vision.

An autostereoscopic display will become the main direction in the future 3D display, and the autostereoscopic display developed toward the multi-view has become the necessary and essential trend. However, the main bottleneck of the current 3D image display technology resides in that the bandwidth is too high because the display has to modulate the colors, the brightnesses and the views simultaneously. Consequently, after the 3D display matches with the flat display technology, it is difficult to achieve the good display effect because too many spatial resolutions are sacrificed or the signal frequency is too high.

At present, the autostereoscopic displays may be classified into a temporal multiplexed display and a spatial multiplexed display. When the 3D image is to be displayed on a multi-view autostereoscopic display in a spatial multiplexed display manner, a lot of spatial resolutions of the display will be sacrificed, and the image quality of the single view of the viewer is greatly reduced. When the 3D image is displayed on the multi-view autostereoscopic display in a temporal multiplexed display manner, the technological problems that the brightness is seriously decreased and the frequency of the image signal is too high may occur although the spatial resolution of the image will not be decreased.

In order to overcome the above-mentioned problems, U.S. Pat. No. 6,351,280 and Taiwan Patent No. 381,394 have disclosed a viewer tracking autostereoscopic display. This display uses the viewer tracking system and can generate the required images of the views corresponding to the position according to the position of the viewer by way of optical modulation. This display needs not to generate many views simultaneously but still can achieve the object of the multi-view. Although this display cannot greatly reduce the spatial resolution of the single view, the cost and the size of the display are increased because the tracking system has to be used.

Thus, it is an important subject of the invention to achieve the high spatial resolution so that the autostereoscopic display, which has the quality of the 3D image that can be accepted by the user and the frequency of the signal that cannot be too high, can be obtained and the 3D display can enter the public market in a popular manner.

SUMMARY

Examples of the present invention may provide a hybrid multiplexed 3D display including a light source, an image splitter, and an image display. The light source is used for sequentially providing a plurality of groups of light emitting toward different emitting directions. The image splitter is disposed above the light source for transmitting each of the groups of light to a view group comprising a plurality of views. The image display is disposed above the light source for providing image data. The groups of light are sequentially transmitted through the image display and the image splitter to respectively generate a plurality of view images at the views such that an image viewed by a user includes at least two of the view images to achieve a stereoscopic visual effect.

Examples of the present invention may provide a method of displaying a hybrid multiplexed 3D image. A plurality of groups of light emitting toward different emitting directions is sequentially provided by a light source. Each of the groups of light is transmitted to a view group including a plurality of views by an image splitter. Image data is generated by an image display and the groups of light are sequentially transmitted through the image display and the image splitter to respectively generate a plurality of view images at the views such that an image viewed by a user includes at least two of the view images to achieve a stereoscopic visual effect.

BRIEF DESCRIPTION OF THE DRAWINGS

FIG. 6A (Prior Art) shows signal waveforms in the spatial multiplexed 3D display with four views according to the prior art.

FIG. 6B (Prior Art) shows signal waveforms in the temporal multiplexed 3D display with four views according to the prior art.

FIG. 6C shows signal waveforms in the hybrid multiplexed 3D display with four views corresponding to FIG. 3B according to the invention.

DETAILED DESCRIPTION OF DISCLOSED EMBODIMENTS

Figure 1A:
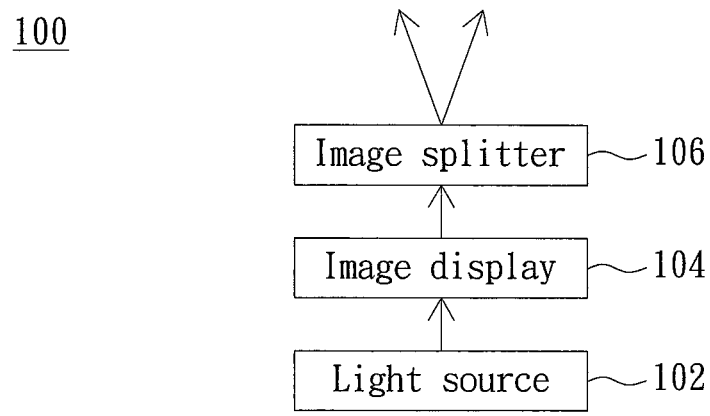
FIGS. 1A and 1B are schematic illustrations showing a hybrid multiplexed 3D display according to a preferred embodiment of the invention.
Figure 1B:
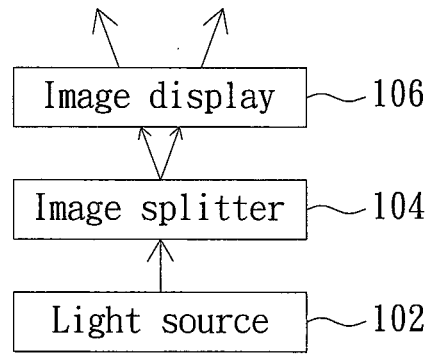

FIGS. 1A and 1B are schematic illustrations showing a hybrid multiplexed 3D display 100 according to a preferred embodiment of the invention. Referring to FIGS. 1A and 1B, the hybrid multiplexed 3D display 100 includes an image display 104, a light source 102 and an image splitter 106. The image display 104 generates an image. The light source 102 sequentially generates light of multiple colors, which is transmitted through the image display 104. The image splitter 106 is disposed above the image display 104, as shown in FIG. 1A, or below the image display 104, as shown in FIG. 1B. The image splitter 106 causes image data, which is obtained after the light is transmitted through the image display 104, to emit toward two or more than two view directions so that the image viewed by a user has at least two views to achieve a stereoscopic visual effect.

Figure 2:
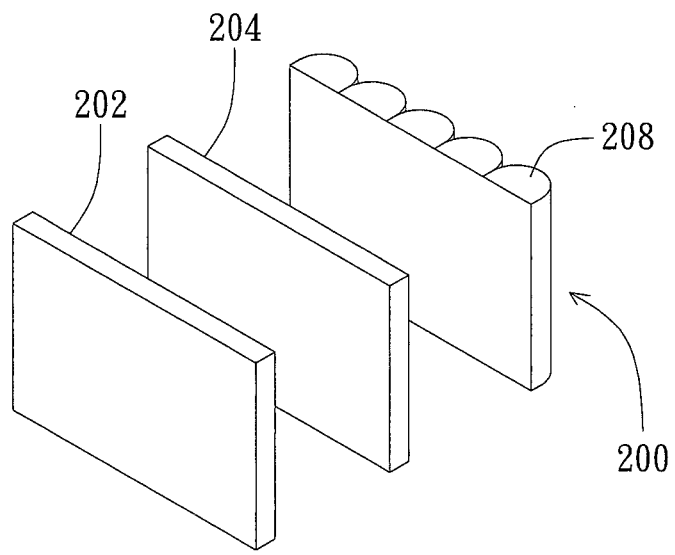
FIG. 2 is an exploded view showing an example of the hybrid multiplexed 3D display of FIG. 1A.

FIG. 2 is an exploded view showing an example of the hybrid multiplexed 3D display 100 of FIG. 1A. As shown in FIG. 2, the image display 104 in a hybrid multiplexed 3D display 200 may be a transmissive display panel 204, such as a transmissive liquid crystal display panel, having no color filter. The image display 104 may also be any other brightness modulator, such as a transmissive electro-optic modulator capable of modulating the light intensity. The transmissive display panel 204 has multiple pixels for generating the image. The light of the colors is sequentially transmitted through the pixels so that the pixels sequentially generate sub-images of the colors. The sub-images correspond to the image.

The light source 102, such as a sequential backlight module 202, sequentially generates the light of the colors. The light of the colors includes, for example, red, green and blue light rays. The light of the colors may also be a combination of other light rays of other colors. The red, green and blue light rays are sequentially transmitted through the pixels so that the pixels sequentially generate a red sub-image, a green sub-image and a blue sub-image, which are combined together to obtain the image.

The image splitter 106 may be, for example, an optical film having a lens array 208, which is composed of multiple rod-like convex lenses arranged longitudinally. However, the invention is not particularly restricted thereto, and any lens array 208, which can image the image onto different positions in the space by way of lens imaging so that the image viewed by the user has the at least two views, may be regarded as falling within the scope of the invention.

Figure 3A:
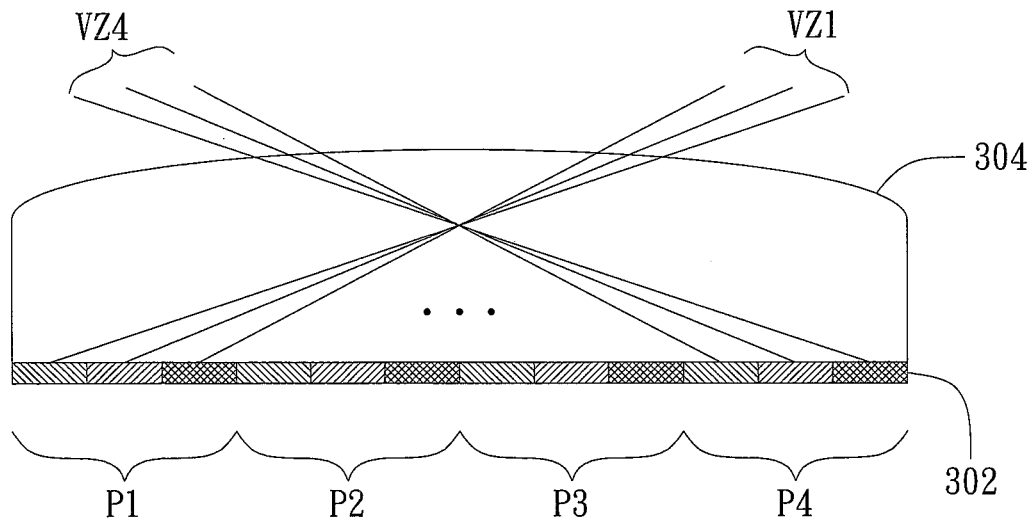
FIG. 3A (Prior Art) is a schematic illustration showing an operation of a spatial multiplexed 3D display according to the prior art.
Figure 3B:
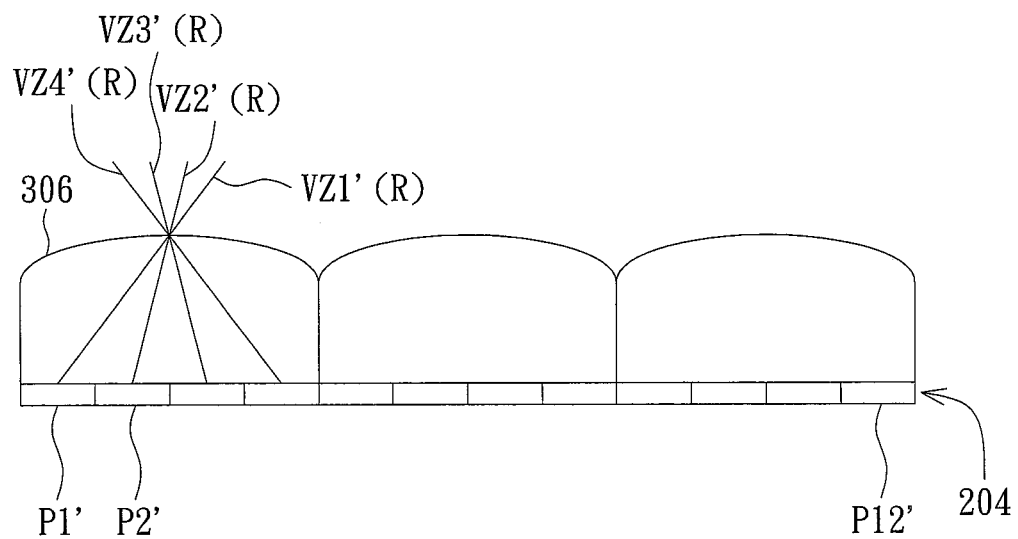
FIG. 3B is a schematic illustration showing an example of an operation of the hybrid multiplexed 3D display of the invention.

FIG. 3A (Prior Art) is a schematic illustration showing an operation of a spatial multiplexed 3D display according to the prior art. FIG. 3B is a schematic illustration showing an example of an operation of the hybrid multiplexed 3D display of the invention. It is assumed that each of the displays of FIGS. 3A and 3B has four views. However, the invention is not particularly limited thereto. That is, the display of the invention may also have two views or any number of views.

In FIG. 3A, a display panel 302 has many pixels, such as pixels P1, P2, P3 and P4. The pixels P1, P2, P3 and P4 constitute a 3D image pixel for respectively displaying the images of four views of the 3D image. Each pixel has a red sub-pixel SP_R, a green sub-pixel SP_G and a blue sub-pixel SP_B. A backlight module (not shown) outputs white light, which is transmitted through red, green and blue filters of three sub-pixels of the pixel P1 and then the red, green and blue light rays are respectively generated. The red, green and blue light rays are further refracted by a convex lens 304, and then the light ray VZ1 corresponding to a first view is generated. Similarly, the light rays emitted from the three sets of sub-pixels of the pixels P2, P3 and P4 are refracted by the convex lens 304, and then the light rays VZ2, VZ3 and VZ4 corresponding to a second view, a third view and a fourth view are generated. Thus, the user can view the color image having four views represented by the pixels P1, P2, P3 and P4.

In FIG. 3B, the transmissive display panel 204 has, for example, pixels P1', P2' ... P12'. Assume an area of one of the pixels P1' to P12' is the same as an area of any sub-pixel of the pixels P1 to P4. The pixels P1' to P4' constitute a first 3D image pixel for displaying the image of one of the pixels of the 3D image of four views. The pixels P5' to P8' constitute a second 3D image pixel, and the pixels P9' to P12' constitute a third 3D image pixel. For example, the sequential backlight module (not shown in the drawing) sequentially outputs the red, green and blue light rays so that the pixel P1' sequentially generates the red, green and blue light rays with the corresponding brightness under the driving of the red, green and blue pixel voltages corresponding to the red, green and blue image data. Thus, the pixel P1' sequentially serves as the red, green and blue pixels at different time instants.

Illustration will be made by taking the red light ray as an example. At a first time instant, the red light ray emitted from the pixel Pr is refracted by a convex lens 306, and then the light ray VZ1' (R) corresponding to the first view is generated. Similarly, the red light rays emitted from the pixels P2', P3' and P4' are refracted by the convex lens 306 and then the red light rays VZ2'(R), VZ3'(R) and VZ4'(R) corresponding to the second view, the third view and the fourth view are generated. At a second time instant, the green light rays emitted from the pixels P1', P2', P3' and P4' are refracted by the convex lens 306, and then the green light rays VZ1' (G), VZ2'(G), VZ3'(G) and VZ4'(G) (not shown) corresponding to the first view, the second view, the third view and the fourth view are generated. At a third time instant, the blue light rays emitted from the pixels P1', P2', P3' and P4' are refracted by the convex lens 306, and then the blue light rays VZ1' (B), VZ2'(B), VZ3'(B) and VZ4'(B) (not shown) respectively corresponding to the first view, the second view, the third view and the fourth view are generated. Thus, the user may receive the light rays of three primary colors of the two views among the four views according to the phenomenon of persistence of vision of the human eyes so as to view the color 3D image represented by the pixels P1' to P4'.

As shown in FIGS. 3A and 3B, when the sub-pixel SP_R of the pixel P1 and the pixel P1' have the same area, the number of 3D image pixels in the hybrid multiplexed 3D display of this embodiment is three times that in the conventional spatial multiplexed 3D display when the display panel 302 and the transmissive display panel 204 have the same area. That is, the spatial resolution of the single view in the hybrid multiplexed 3D display of this embodiment is three times that in the conventional spatial multiplexed 3D display. Thus, compared with the conventional spatial multiplexed 3D display, the hybrid multiplexed 3D display of this embodiment has the characteristic of increasing the spatial resolution of the single view when the number of views is kept constant.

Figure 4A:
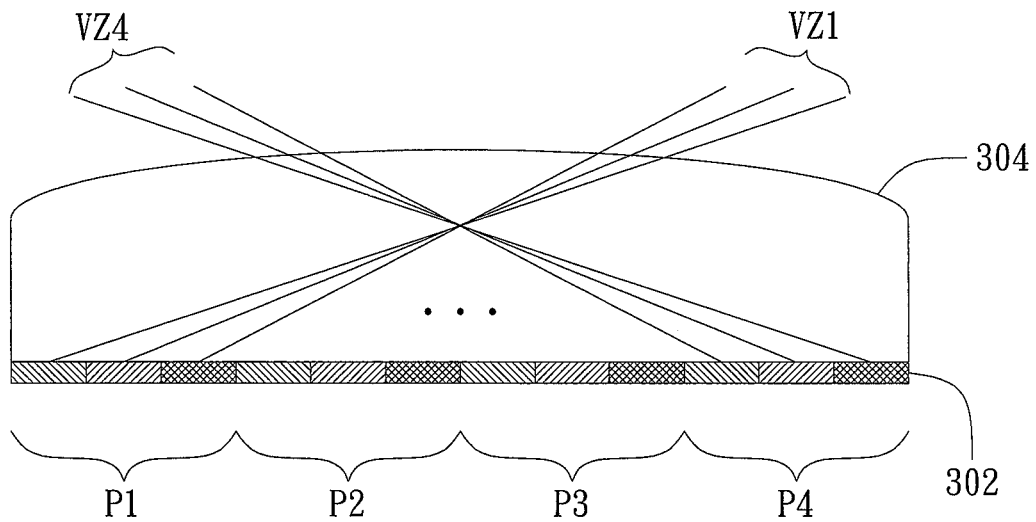
FIG. 4A (Prior Art) is a schematic illustration showing the operation of the spatial multiplexed 3D display according to the prior art.
Figure 4B:
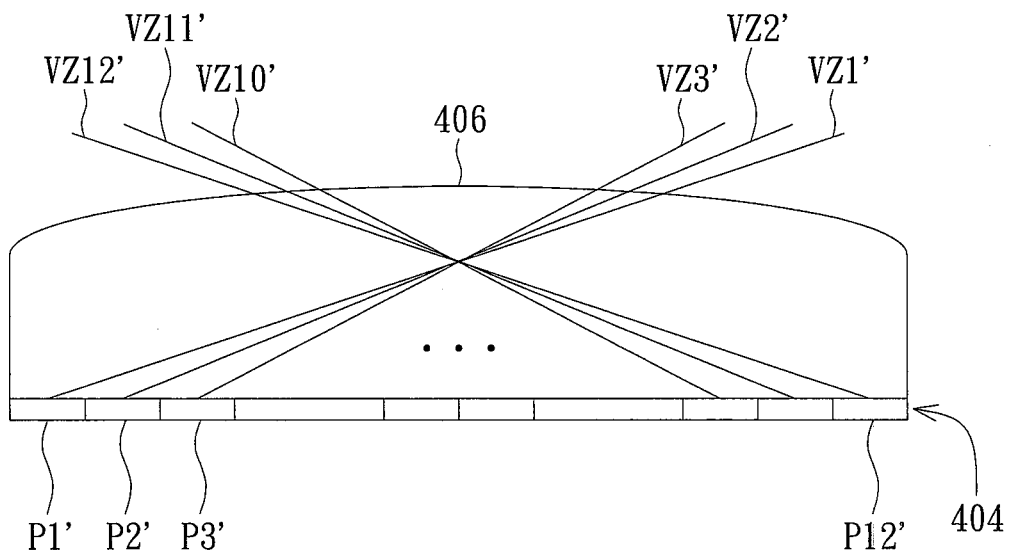
FIG. 4B is a schematic illustration showing another example of the operation of the hybrid multiplexed 3D display of the invention.

FIG. 4A (Prior Art) is a schematic illustration showing the operation of the spatial multiplexed 3D display according to the prior art. FIG. 4B is a schematic illustration showing another example of the operation of the hybrid multiplexed 3D display of the invention. Assume that the display of FIG. 4A has four views, and the display of FIG. 4B has 12 views.

The 3D display of FIG. 4A is the same as the 3D display of FIG. 3A and can display the color image with four views. In FIG. 4B, it is assumed that the area of one of the pixels P1' to P12' is also the same as the area of any sub-pixel of the pixels P1 to P4. The display panel 302 and a transmissive display panel 404 have the same area. In a condition that the spatial resolution of the single view in the hybrid multiplexed 3D display of this embodiment is the same as that in the conventional spatial multiplexed 3D display, the number of the views of this embodiment may be three times that of the conventional spatial multiplexed 3D display. In FIG. 4A, the pixels P1 to P4 constitute one 3D image pixel. In FIG. 4B, the display of this embodiment can make the pixels P1' to P12' constitute a 3D image pixel using one convex lens 406 so that the light rays VZ1', VZ2' . . . VZ12' of 12 views in one 3D image pixel are generated. Consequently, the number of the views in the hybrid multiplexed 3D display of FIG. 4B may be indeed three times that in the conventional spatial multiplexed display of FIG. 4A.

Figure 5A:
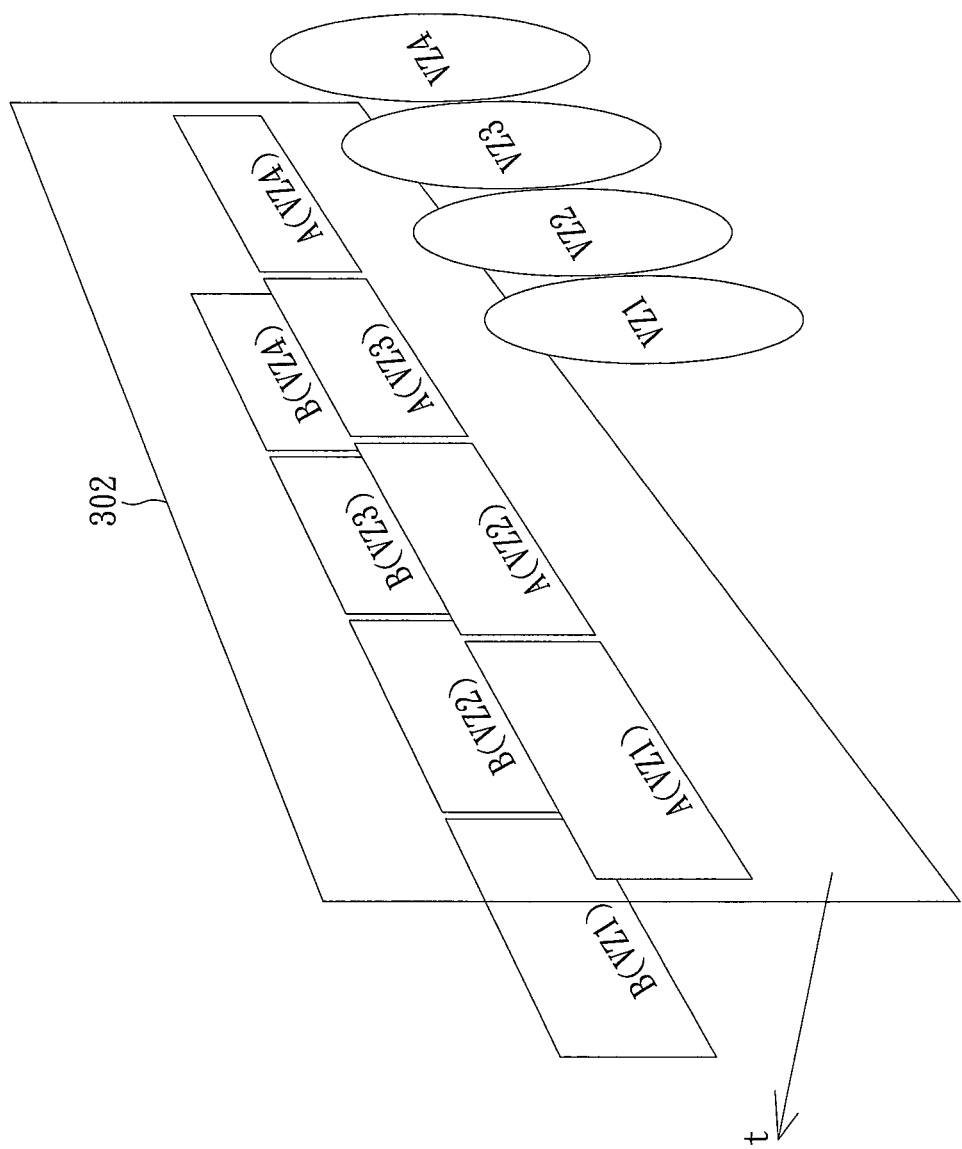
FIG. 5A (Prior Art) is a schematic illustration showing image data transmission of the spatial multiplexed 3D display with four views according to the prior art.
Figure 5B:
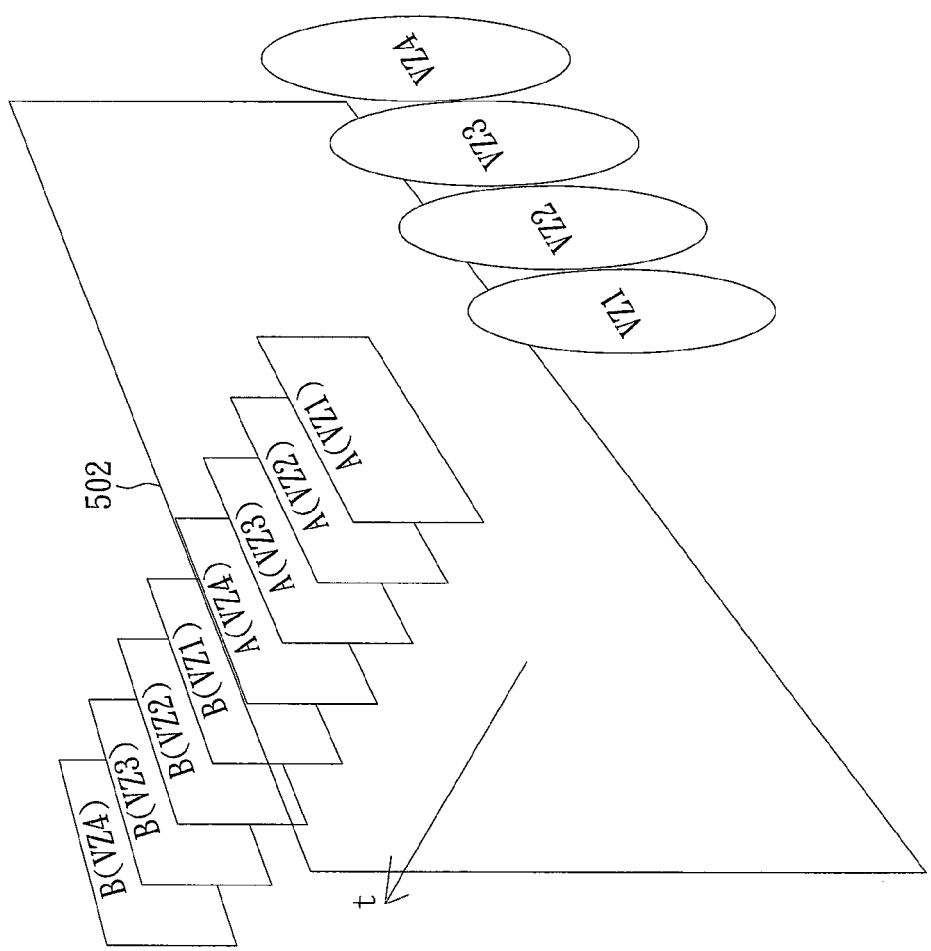
FIG. 5B (Prior Art) is a schematic illustration showing image data transmission of a temporal multiplexed 3D display with four views according to the prior art.
Figure 5C:
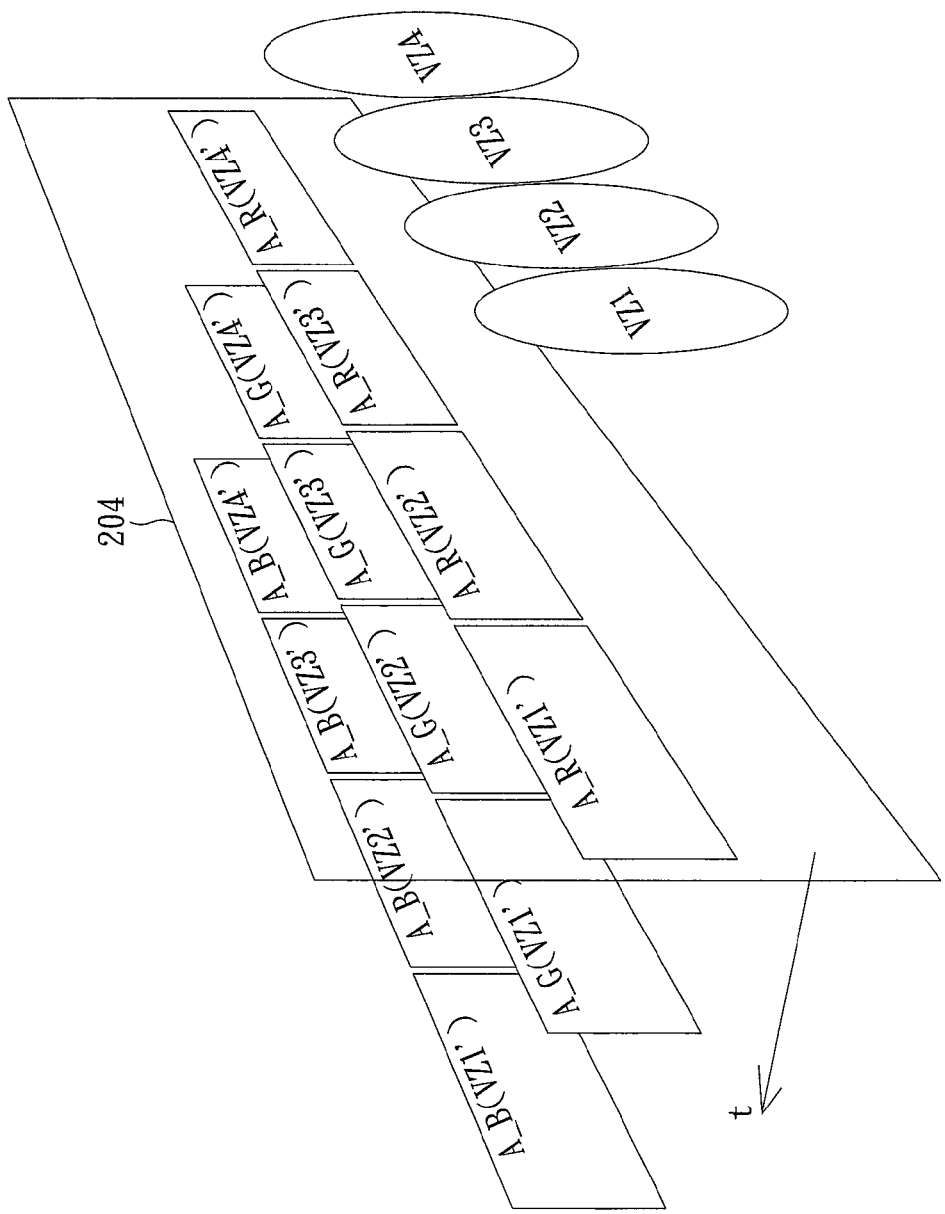
FIG. 5C is a schematic illustration showing image data transmission of the hybrid multiplexed 3D display with four views corresponding to FIG. 3B according to the invention.

FIG. 5A (Prior Art) is a schematic illustration showing image data transmission of the spatial multiplexed 3D display with four views according to the prior art. FIG. 5B (Prior Art) is a schematic illustration showing image data transmission of a temporal multiplexed 3D display with four views according to the prior art. FIG. 5C is a schematic illustration showing image data transmission of the hybrid multiplexed 3D display with four views corresponding to FIG. 3B according to the invention.

In FIG. 5A, the image data A(VZ1), A(VZ2), A(VZ3) and A(VZ4) of four views of the frame A may be simultaneously transmitted to the display panel 302. At the next time instant, the image data B(VZ1), B(VZ2), B(VZ3) and B(VZ4) of four views of the frame B may be transmitted to the display panel 302 simultaneously.

In FIG. 5B, the image data A(VZ1), A(VZ2), A(VZ3) and A(VZ4) of four views of the frame A are sequentially transmitted to a display panel 502 at different time instants, respectively. At the next four time instants, the image data B(VZ1), B(VZ2), B(VZ3) and B(VZ4) of four views of the frame B are sequentially transmitted to the display panel 502, respectively.

In FIG. 5C, the red image data A_R(VZ1'), A_R(VZ2'), A_R(VZ3') and A_R(VZ4') of four views of the frame A are transmitted to the display panel 204 simultaneously. At the next time instant, the green image data A_G(VZ1'), A_G(VZ2'), A_G(VZ3') and A_G(VZ4') of four views of the frame A are transmitted to the display panel 204 simultaneously. At still the next time instant, the blue image data A_B(VZ1'), A_B(VZ2'), A_B(VZ3') and A_B(VZ4') of four views of the frame A are simultaneously transmitted to the display panel 204. Compared with the conventional temporal multiplexed 3D display of FIG. 5B, the hybrid multiplexed 3D display of this embodiment of FIG. 5C has the lower image data updating frequency. More particularly, when the difference between the numbers of views is higher, the difference therebetween becomes more obvious.

FIG. 6A (Prior Art) shows signal waveforms in the spatial multiplexed 3D display with four views according to the prior art. FIG. 6B (Prior Art) shows signal waveforms in the temporal multiplexed 3D display with four views according to the prior art. FIG. 6C shows signal waveforms in the hybrid multiplexed 3D display with four views corresponding to FIG. 3B according to the invention. As shown in FIGS. 6A, 6B and 6C, V_sync represents the vertical sync signal of the display panel, and R, G, B respectively represent the red, green and blue light rays outputted from the display panel.

As shown in FIG. 6A, the display panel of the spatial multiplexed 3D display generates the red light ray R, the green light ray G and the blue light ray B in the time period T1 simultaneously. The light ray VZ1 of the first view, the light ray VZ2 of the second view, the light ray VZ3 of the third view, and the light ray VZ4 of the fourth view are also generated simultaneously.

As shown in FIG. 6B, the display panel of the temporal multiplexed 3D display generates the red light ray R, the green light ray G and the blue light ray B in the time period T1 simultaneously. The light ray VZ1 of the first view, the light ray VZ2 of the second view, the light ray VZ3 of the third view and the light ray VZ4 of the fourth view are generated in the time periods T1, T2, T3 and T4, respectively. That is, a certain pixel generates the light rays VZ1 to VZ4 of different views in the different time periods T1, T2, T3 and T4.

As shown in FIG. 6C, the display panel of the hybrid multiplexed 3D display of this embodiment generates the red light ray R, the green light ray G and the blue light ray B in the time periods T1, T2 and T3, respectively. The light ray VZ1' of the first view, the light ray VZ2' of the second view, the light ray VZ3' of the third view and the light ray VZ4' of the fourth view, which correspond to the first view of the sub-frame of the same color, are generated simultaneously.

As shown in FIGS. 6A to 6C, compared with the spatial multiplexed 3D display, in which a full image display frame, being a full-color frame, may be seen at a single time and in a single view, only a portion of the image display frame, being a single color frame, is seen at a single time and in a single view in this embodiment. The hybrid multiplexed 3D display combines view modulation in space domain and color modulation in time domain. Thus, the embodiment has the characteristics of spatial modulation and time modulation.

In FIG. 3A, the area of one of the pixels P1' to P12' is the same as the area of any sub-pixel of the pixels P1 to P4 in FIG. 3B. In the visible range that cannot be recognized by the human eyes, if the spatial resolution of the single view of the hybrid multiplexed 3D display of this embodiment can be slightly lowered, the area of one of the pixels P1' to P12' is also configured to be larger than the area of any sub-pixel of the pixels P1 to P4. Taking the pixels P1 and P1' as an example, the area of the pixel P1' may be smaller than the area of the pixel P1, and the area of the pixel P1' may be greater than one third of the area of the pixel P1. The horizontal width of the pixel P1' is smaller than the horizontal width of the pixel P1, and the horizontal width of the pixel P1' is greater than one third of the horizontal width of the pixel P1.

When the area of the pixel P1' is larger than the area of any sub-pixel of the pixel P1, the aperture ratio of the pixel P1' may be greater than the aperture ratio of any sub-pixel of the pixel P1. Thus, a dead-view zone generated in an opaque zone between the pixel P1' and its neighboring pixel in the image viewed by the user is reduced.

Figure 9:
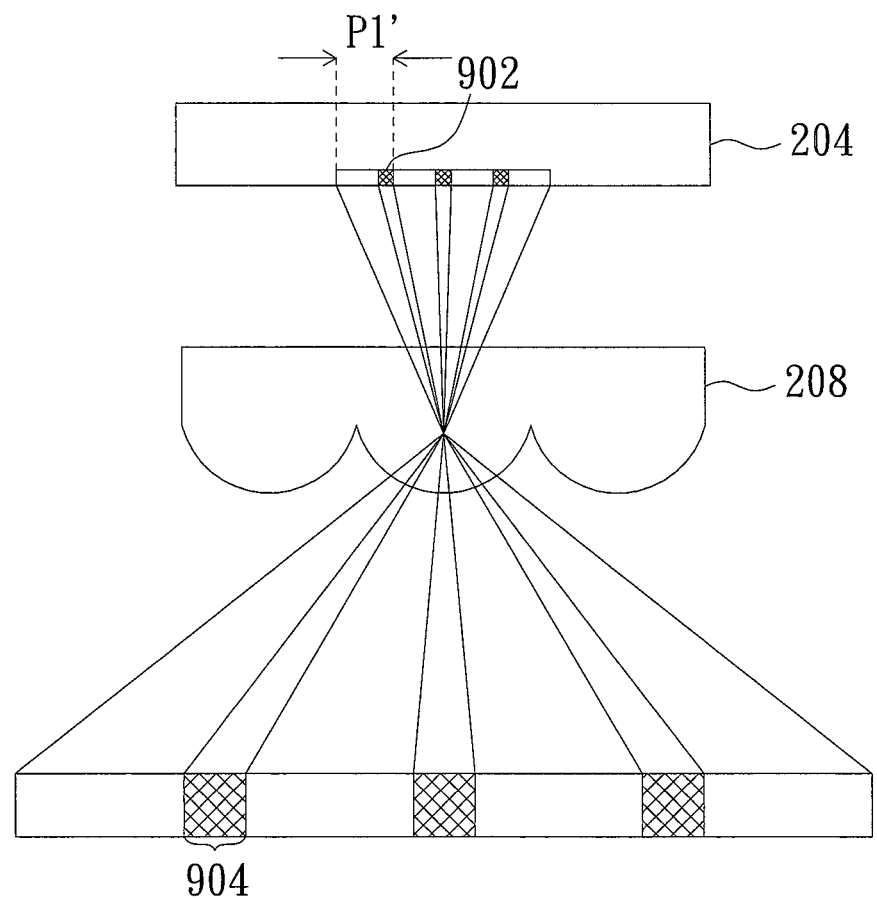
FIG. 9 is a schematic illustration showing a non-emissive region on the image display corresponding to a dead-view zone on a view according to an example.

FIG. 9 is a schematic illustration showing a non-emissive region on the image display corresponding to a dead-view zone on a view according to an example. As shown in FIG. 9, when an opaque zone 902 between the pixel P1' and its neighboring pixel is reduced, a dead-view zone 904 corresponding to the opaque zone 902 is reduced so that the image quality can be enhanced.

Figure 7:
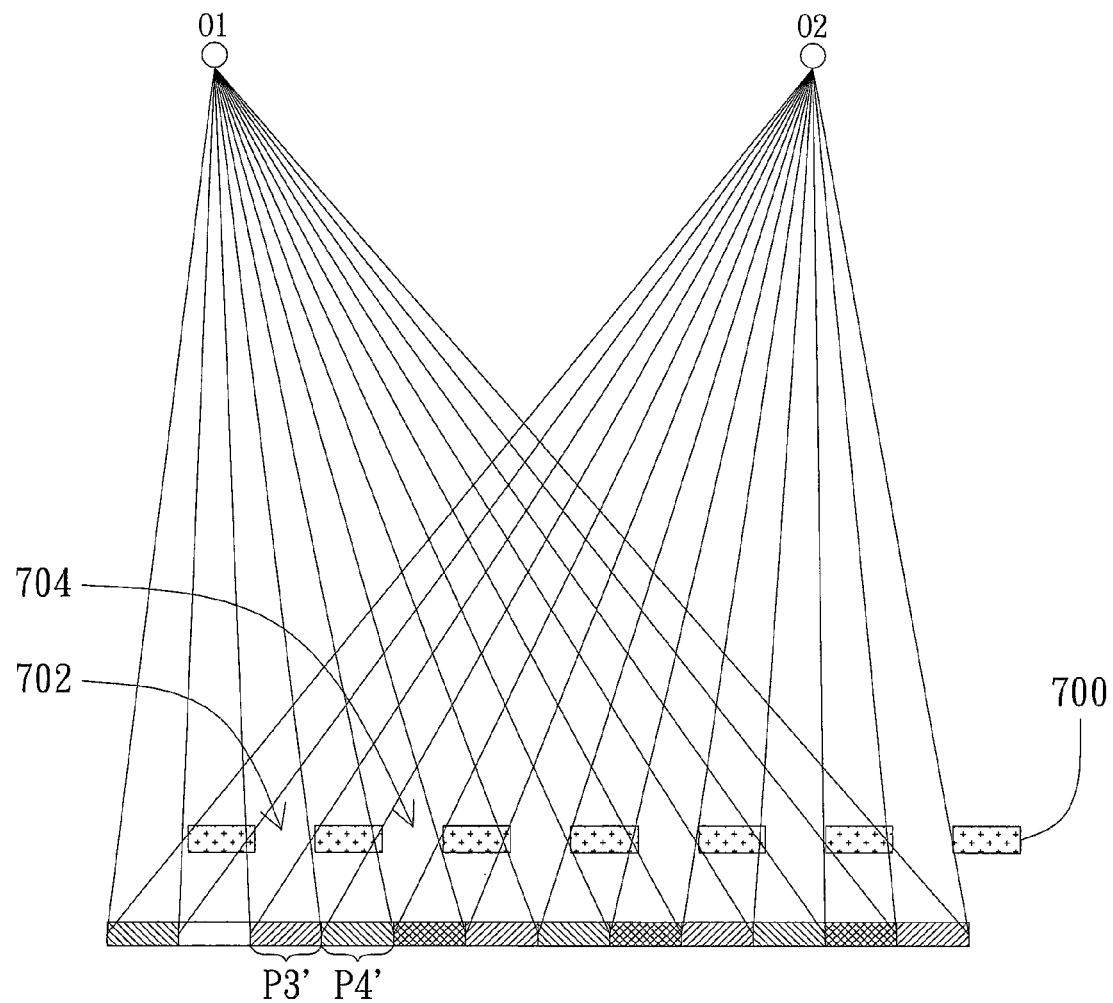
FIG. 7 is a schematic illustration showing the hybrid multiplexed 3D display of the invention having an optical film with pinholes to serve as an image splitter.

In addition, the image splitter 106 may also be achieved by an optical film 700 having pinholes, as shown in FIG. 7. The image splitter 106 may also be referred to as a pinhole/screened image splitter, which images an image onto different positions in the space by way of pinhole imaging so that the image viewed by the user has at least two views. For example, the light rays (red, green or blue light rays) emitted from the pixels P3' and P4' are transmitted through the pinholes 702 and 704 and emit toward the positions O1 and O2 so that the two different views are formed.

More particularly, the image splitter 106 may also be achieved by a color filter.

Figure 8A:
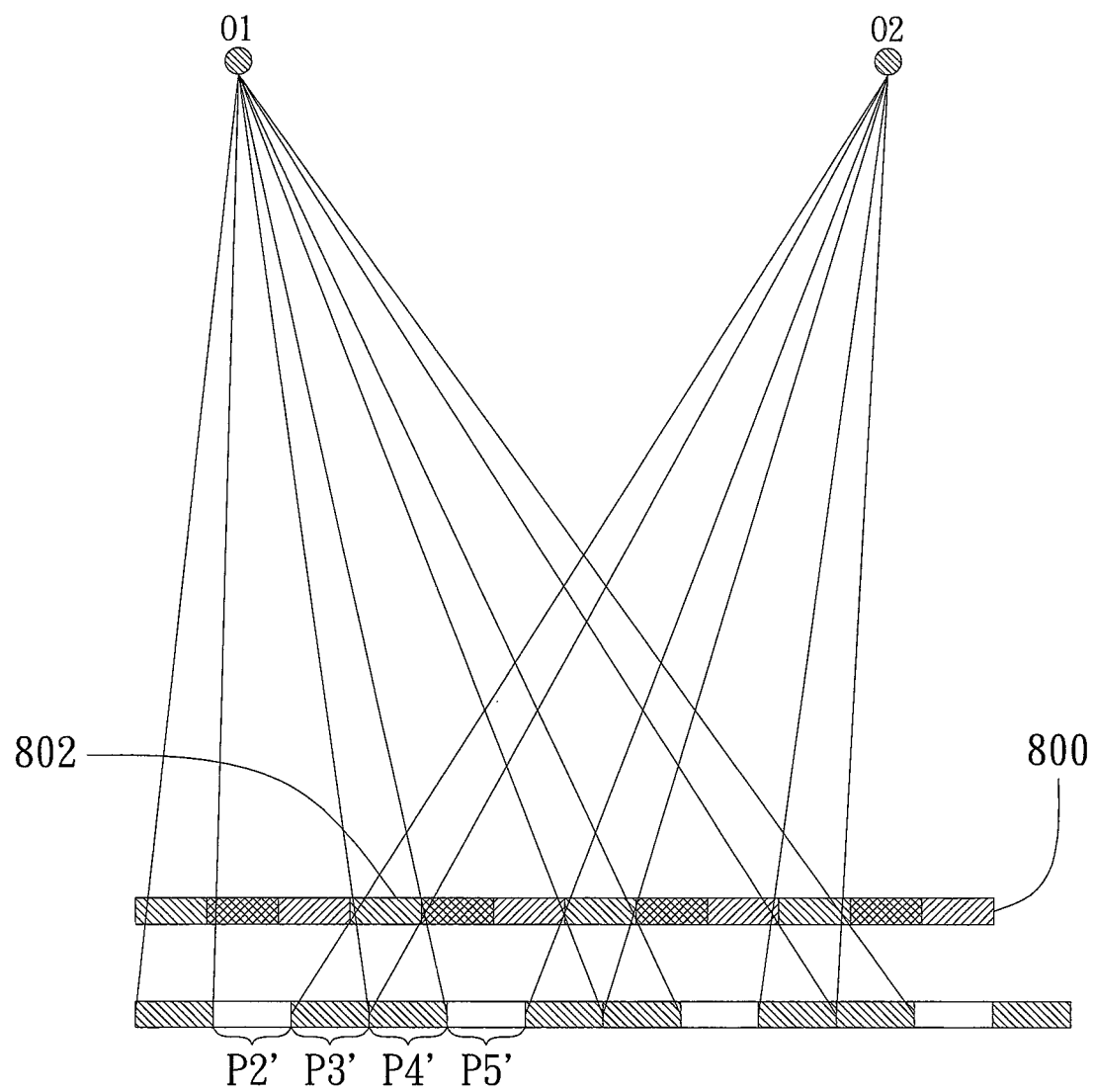
FIGS. 8A to 8C are schematic illustrations showing another example of the hybrid multiplexed 3D display when the image splitter is achieved by a color filter and the pixels respectively represent a red sub-frame, a green sub-frame and a blue sub-frame.
Figure 8B:
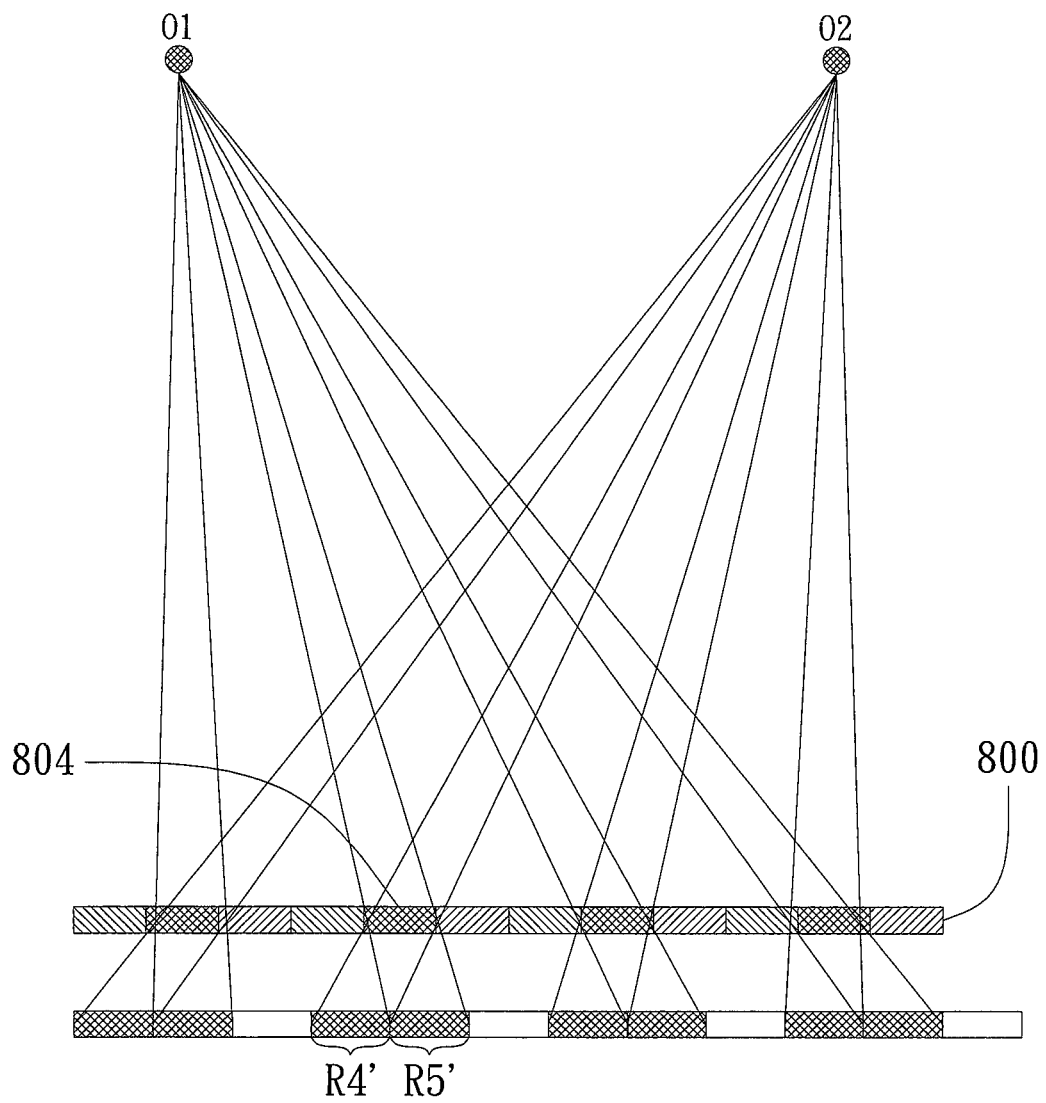
Figure 8C:
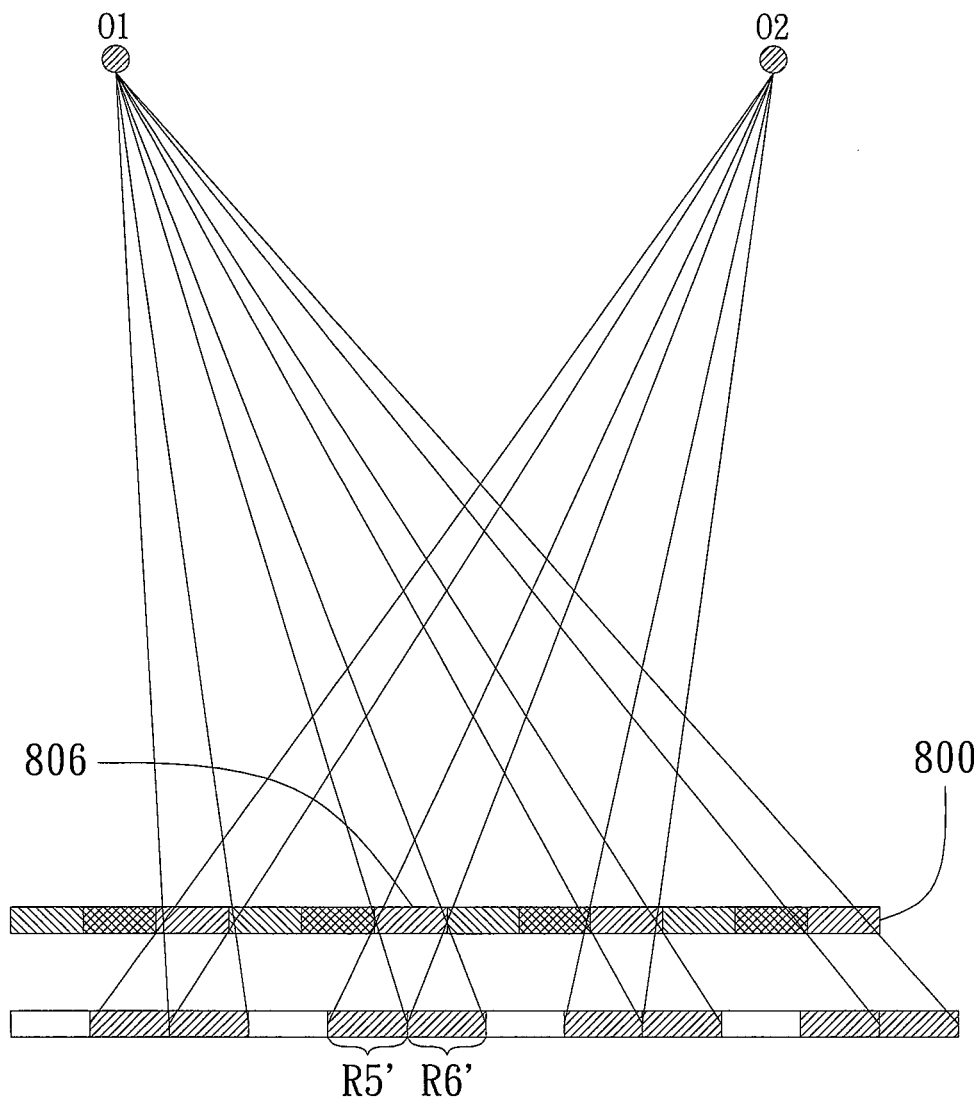

FIGS. 8A to 8C are schematic illustrations showing another example of the hybrid multiplexed 3D display when the image splitter 106 is achieved by a color filter 800 and the pixels respectively represent a red sub-frame, a green sub-frame and a blue sub-frame. The color filter 800 has many filtering units, such as 802, 804 and 806. The neighboring filtering units respectively have different colors. The number of the colors of these filtering units is the same as the number of the colors of the light rays. In this embodiment, the number of the colors of the filtering units is 3. The filtering unit may be a red filtering unit, a green filtering unit or a blue filtering unit, which are arranged in sequence.

The light transmitted through the neighboring two pixels is transmitted through one neighboring filtering unit corresponding to the color of light so that the image viewed by the user has at least two views. The pixels P3' and P4' will be illustrated in the example. As shown in FIG. 8A, when the display panel displays the red sub-frame, the red light rays emitted from the pixels P3' and P4' are transmitted through the red filtering unit 802 and reach the positions O1 and O2 to form two different views, respectively. As shown in FIG. 8B, when the display panel displays the green sub-frame, the green light rays emitted from the pixels P4' and P5' are transmitted through the green filtering unit 804 and reach the positions O1 and O2 to form two different views, respectively. As shown in FIG. 8C, when the display panel displays the blue sub-frame, the blue light rays emitted from the pixels P5' and P6' are transmitted through the blue filtering unit 806 and reach the positions O1 and O2 to form two different views, respectively. The red filtering unit 802, the green filtering unit 804 and the blue filtering unit 806 are arranged in sequence.

Opaque pixels may be disposed on sides of two neighboring red pixels. For example, the opaque pixels P2' and P5' are respectively disposed on two sides of the two neighboring red pixels P3' and P4'. The opaque pixels P2' and P5 turn into dark states after the red image data corresponding to a dark state is transmitted to the pixels P2' and P5'. Thus, the interference between the images of different views may be reduced.

The image splitter using the color filter may achieve the effect similar to the pinhole of the optical film according to the property that the light with the specific color only can be transmitted through the filtering unit with the specific color.

Figure 10:
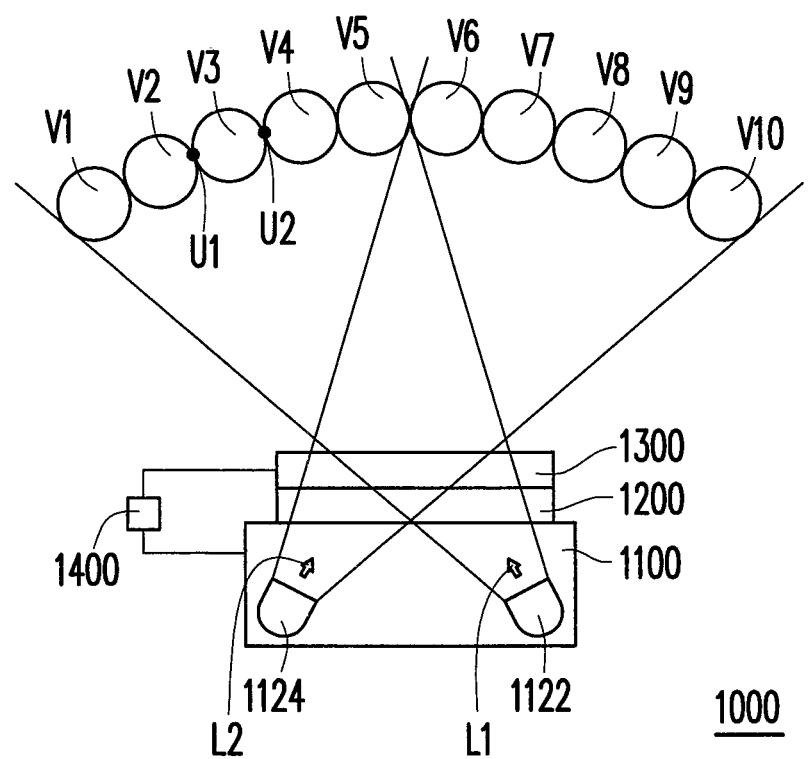
FIG. 10 is a schematic illustration showing a hybrid multiplexed 3D display according to an alternate embodiment of the disclosure.

FIG. 10 is a schematic illustration showing a hybrid multiplexed 3D display according to an alternate embodiment of the disclosure. Referring to FIG. 10, a hybrid multiplexed 3D display 1000 comprises a light source 1100, an image splitter 1200, and an image display 1300. The image splitter 1200 and the image display 1300 are disposed above the light source 1100 and particularly, the image splitter 1200 can be, but is not restricted to, located between the image display 1300 and the light source 1100. In the present embodiment, the light source 1100 is used for sequentially providing a first group of light L1 and a second group of light L2 emitting toward different emitting directions. The image splitter 1200 is used for causing the first group of light L1 to be transmitted to a first view group comprising the views V1~V5 and causing the second group of light L2 to be transmitted to a second view group comprising the views V6~V10 and the image display 1300 can provide the required image data. Accordingly, the first group of light L1 and the second group of light L2 respectively transmitted through the image display 1300 and the image splitter 1200 can generate a plurality of view images at the views V1~V10 such that an image viewed by a user can comprise at least two of the view images to achieve a stereoscopic visual effect.

The first group of light L1 and the second group of light L2 are respectively generated by two directional light emitting devices 1122 and 1124. In an example, the directional light emitting devices 1122 and 1124 exemplarily comprise a plurality of point light emitting devices such as light emitting diodes, but the disclosure is not limited thereto. In an alternate example, each of the directional light emitting devices 1122 and 1124 can be formed by a linear light emitting device disposed with a reflector for emitting toward particular emitting direction. In specific, any light emitting device capable of emitting light toward a particular emitting direction can be applied in the embodiment of the disclosure.

In the present embodiment, the first group of light L1 and the second group of light L2 can be sequentially provided for achieving the view images at the views V1~V10. Herein, the image splitter 1200 and the image display 1300 have the functions similar to the image splitter 104 and the image display 106 depicted in the above embodiments, such that the displaying method can be referred to the above descriptions as depicted in FIGS. 3B and 4B.

In specific, in a first period, the directional light emitting device 1122 is lighted and the directional light emitting device 1124 is not lighted to provide the first group of light L1 independently. Based on the imaging method depicted in FIGS. 3B and 4B, a plurality of view images can be transmitted to the views V1~V5 after the first group of light L1 passes through the image splitter 1200 and the image display 1300.

In a second period, the directional light emitting device 1124 is lighted and the directional light emitting device 1122 is not lighted so that the second group of light L2 is individually provided. Now, after the second group of light L2 passes through the image splitter 1200 and the image display 1300, a plurality of view images can be transmitted to the views V6~V10. Accordingly, the hybrid multiplexed 3D display 1000 can display the view images at ten views V1~V10. The image viewed by the user can comprise at least two of the view images at the ten views V1~V10 for achieving the 3D visual effect.

Based on the foregoing display method, the image display 1300 and the light source 1100 are required to be synchronically operated and thus the hybrid multiplexed 3D display 1000 can further comprise a synchronizing controller 1400 connecting to the image display 1300 and the light source 1100 for synchronizing image data provided by the image display 1300 and the groups of light L1 and L2 provided by the light source 1100.

Furthermore, the image display 1300 can have the color filter function for displaying color image data so that the first group of light L1 and the second group of light L2 can respectively be a white light. In an alternate example, the image display 1300 can be configure without the color filter function and the first group of light L1 and the second group of light L2 can comprise light of multiple colors. Herein, the display method of the hybrid multiplexed 3D display 1000 can be referred to those depicted in FIG. 5C and FIG. 6C.

For example, the image display 1300 can be a transmissive display panel having a plurality of pixels as shown in FIG. 3B and FIG. 4B for generating colorless image data. In the first period of providing the first group of light L1, the directional light emitting device 1122 emits light of different colors sequentially rather emits a white light. The light of the colors generated from the directional light emitting device 1122 can be sequentially transmitted through the pixels to sequentially generate a plurality of sub-view images of the colors. The sub-view images of the colors can form the view images of the colors viewed by the user on the views V1~V5.

Subsequently, in the second period of providing the second group of light L2, the directional light emitting device 1124 can sequentially emit light of different colors while the directional light emitting device 1122 is not lighted. Accordingly, a plurality of sub-view images of the colors can form the view images of the colors viewed by the user on the views V6~V10. In the present embodiment, the directional light emitting devices 1122 and 1124 can be respectively a sequential directional light emitting device suitable for sequentially generating the light of the colors. Additionally, the light of colors can comprise red light, green light blue light, or other color light. Therefore, each of the groups of light L1 and L2 can comprise red light, green light, and blue light sequentially emitted.

Specifically, two view groups are defined by using two groups of light L1 and L2 emitting toward different emitting directions, wherein the display light can emit toward large viewing angles so as to achieve the wide viewing angle effect of 3D display. In addition, the ten views V1~V10 according to the present embodiment are substantially distributed side by side in the space. When the position of the user viewing the 3D image displayed by the hybrid multiplexed 3D display 1000 is shifted, the image viewed by the user can still comprise at least two of the view images at the ten views V1~V10. For example, if the user at a first position U1 views the view images at the view V2 and the view V3, he or she can view the view images at view V3 and the view V4 when shifting to the position U2. Now, the user can still see a 3D image because the view images at different views V3 and V4 are viewed. Accordingly, the increased numbers of the views is conducive to improve the 3D display quality because the motion parallax can be mitigated.

It is noted that the view images at the views V1~V5 of the first view group or the view images at the views V6~V10 of the second view group are simultaneously displayed, and thus the resolution of the view image at each of the views V1~V10 is ⅕ of the resolution of the image display 1300. However, for achieving ten views, the spatial multiplexed 3D display according to the prior art based on those depicted in FIG. 5A renders the resolution of the view image at each view to be reduced to 1/10 of the resolution of the image display. Accordingly, the hybrid multiplexed 3D display 1000 of the present embodiment can obviously improve the resolution of the 3D image.

Furthermore, for achieving ten views V1~V10 according to the present embodiment, the refreshing frequencies of the image display 1300 and the light source 1100 can be respectively twice of the refreshing frequency of the achieved 3D image. However, the temporal multiplexed 3D display according to the prior art based on those depicted in FIG. 5B requires the refreshing frequency of the image display to be ten times of the refreshing frequency of the 3D image, which causes a serious burden of the driving circuit and would likely deteriorate the display quality thereof. Accordingly, the hybrid multiplexed 3D display 1000 of the present embodiment can further obviously reduce the driving burden for achieving more views.

Figure 11:
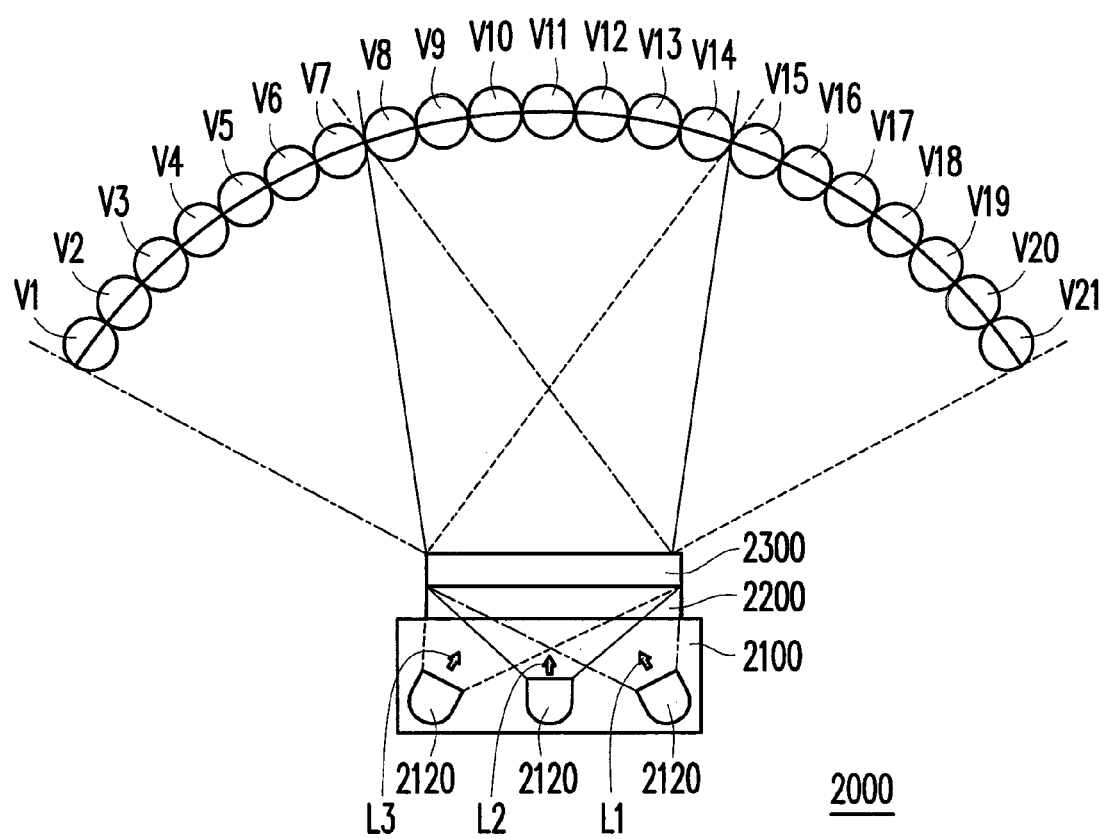
FIG. 11 is a schematic illustration showing a hybrid multiplexed 3D display according to another embodiment of the disclosure.

It is noted that the hybrid multiplexed 3D display 1000 can provide the 3D image displayed at ten views V1~V10 by using two directional light emitting devices 1122 and 1124. Nevertheless, the disclosure is not limited thereto. In an alternate embodiment, the numbers of the directional light emitting devices can be more than two. For example, FIG. 11 is a schematic illustration showing a hybrid multiplexed 3D display according to another embodiment of the disclosure. Referring to FIG. 11, the hybrid multiplexed 3D display 2000, similar to the hybrid multiplexed 3D display 1000, comprises a light source 2100, an image splitter 2200, and an image display 2300. The image splitter 2200 and the image display 2300 are substantially the same to the image splitter 1200 and the image display 1300 depicted in FIG. 10 and the functions thereof can be referred to the above descriptions. In specific, the main difference between the hybrid multiplexed 3D display 2000 and the hybrid multiplexed 3D display 1000 lies in that the light source 2100 of the hybrid multiplexed 3D display 2000 comprises three directional light emitting devices 2120.

In the present embodiment, the three directional light emitting devices 2120 emit light toward three different emitting directions to provide a first group of light L1, a second group of light L2, and a third group of light L3. Based on the display method mentioned in above, a plurality of view images can be displayed at the views V1~V7 of a first view group by transmitting the first group of light L1 through the image splitter 2200 and the image display 2300, a plurality of view images can be displayed at the views V8~V14 of a second view group by transmitting the second group of light L2 through the image splitter 2200 and the image display 2300, and a plurality of view images can be displayed at the views V15~V21 of a third view group by transmitting the third group of light L3 through the image splitter 2200 and the image display 2300. Namely, each of the first, second, and third groups of light L1, L2, and L3 can be provided for generating a view group comprising seven views in the present embodiment and twenty one views V1~V21 are achieved, which conduces to improve the display quality of the 3D image. It is noted that each of the light emitting devices 2120 in the present embodiment can be constructed by a sequential directional light emitting device for providing light of colors sequentially such that the displayed 3D images can have multi color even if the image display 2300 does not have the color filter function.

Figure 12A:
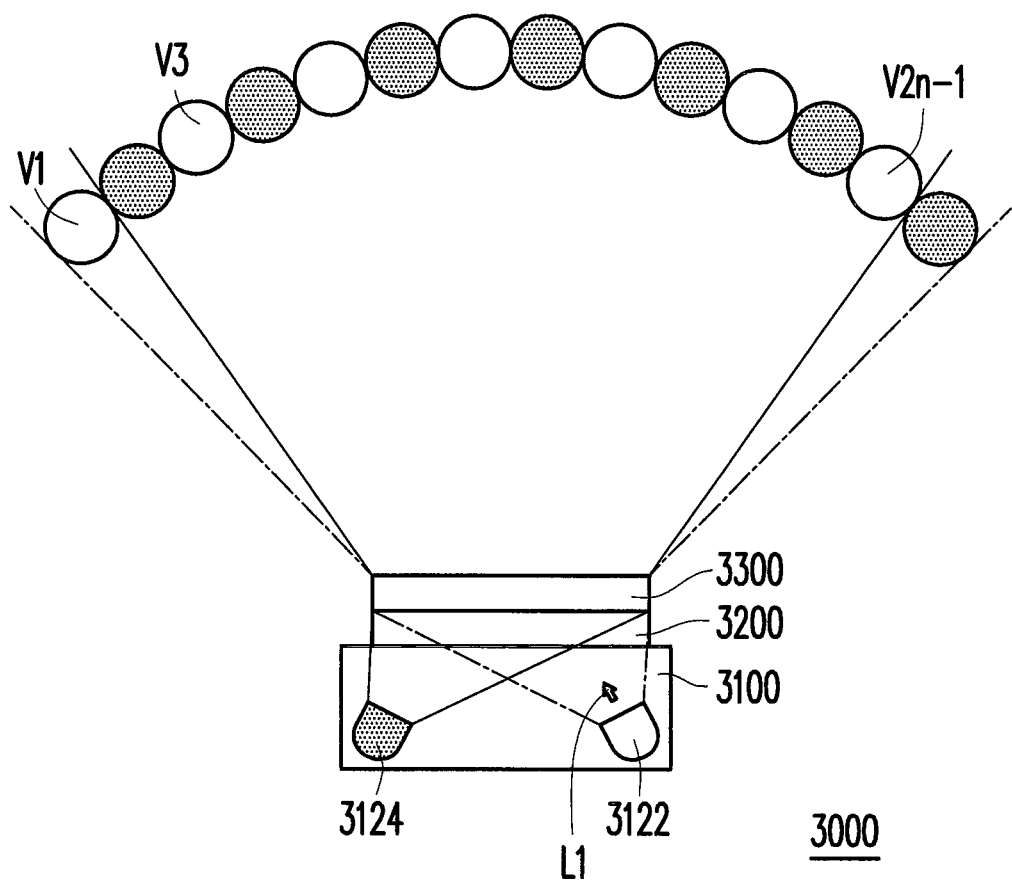
FIG. 12A and FIG. 12B are schematic illustrations showing a hybrid multiplexed 3D display according to further another embodiment of the disclosure.
Figure 12B:
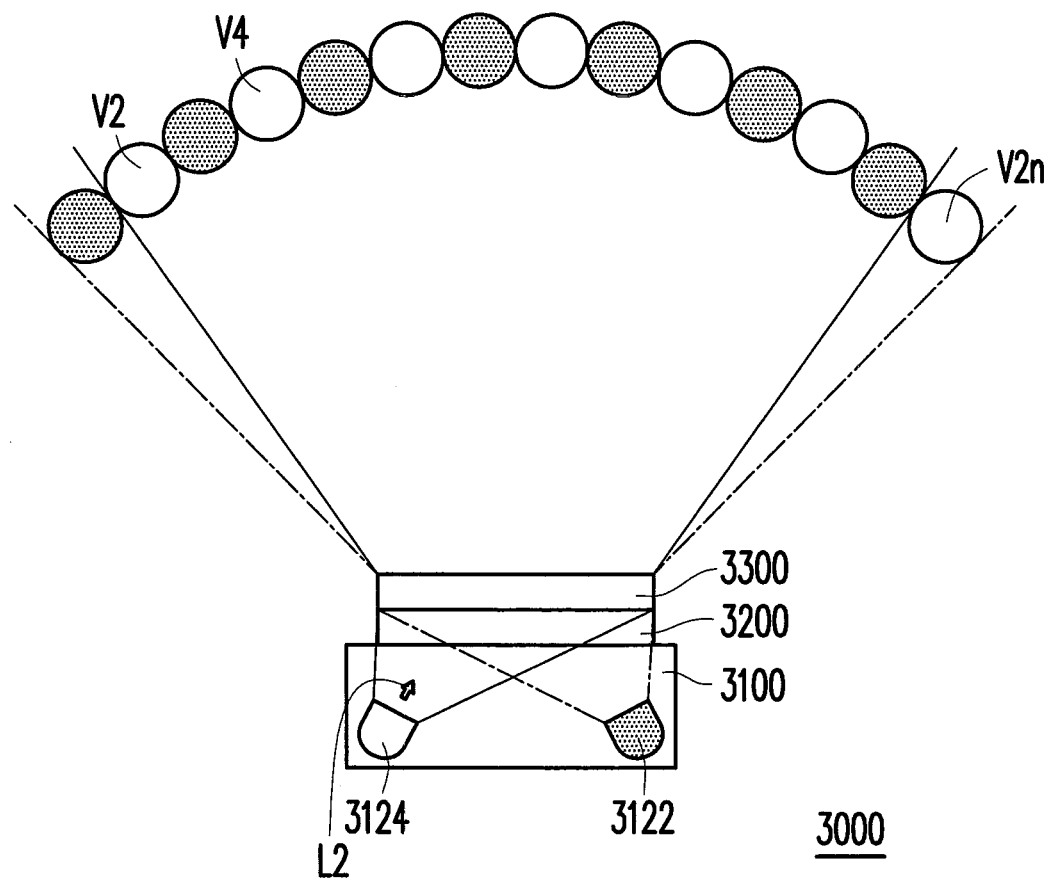

FIG. 12A and FIG. 12B are schematic illustrations showing a hybrid multiplexed 3D display according to further another embodiment of the disclosure. Referring to FIG. 12A and FIG. 12B, the hybrid multiplexed 3D display 3000 comprises a light source 3100, an image splitter 3200, and an image display 3300. The image splitter 3200 and the image display 3300 are disposed above the light source 3100 and are similar to those depicted in the above embodiments. Accordingly, the function of the image splitter 3200 mainly lies in imaging the light emitted from the light source 3100 at certain views and the function of the image display 3300 mainly lies in providing image data. In the present embodiment, the image splitter 3200 is exemplarily located between the image display 3300 and the light source 3100, but in another example, the image display 3300 can be selectively located between the image splitter 3200 and the light source 3100.

It is noted that the light source 3100 comprises two directional light emitting devices 3122 and 3124. The directional light emitting device 3122 emits a first group of light L1 and the directional light emitting device 3124 emits a second group of light L2, wherein the first group of light L1 and the second group of light L2 emit toward different emitting directions. The first group of light L1 and the second group of light L2 can be alternatively generated for displaying 3D images.

Specifically, in a first period, as shown in FIG. 12A, the directional light emitting device 3122 can be lighted to provide the first group of light L1 while the directional light emitting device 3124 is not lighted. The first group of light L1 can be imaged at views V1, V3 . . . V2n−1 of a first view group after transmitting through the image splitter 3200 and the image display 3300, wherein n is an integer greater than zero. Accordingly, a plurality of view images can be generated at views V1, V3 . . . V2n−1 of the first view group.

In a second period, as shown in FIG. 12B, the directional light emitting device 3124 can be lighted and the directional light emitting device 3122 is not lighted. Now, the second group of light L2 is provided to transmit toward the image splitter 3200 and the image display 3300. Accordingly to the functions of the image splitter 3200 and the image display 3300, the second group of light L2 can be transmitted to the views V2, V4 . . . V2n of a second view group to generated a plurality of view images.

In the present embodiment, the emitting directions of the first group of light L1 and the second group of light L2 are different, and thus the first group of light L1 and the second group of light L2 can be transmitted to different view groups in a space by subjecting the effect of the image splitter 3200. Accordingly, the views V2, V4 . . . V2n can be interposed between the views V1, V3 . . . V2n−1 and total 2n views can be defined in the present embodiment. It is noted that the view images of the views V1, V3 . . . V2n−1 of the first view group as well as the view images of views V2, V4 . . . V2n of the second view group are simultaneously displayed. Therefore, the resolution of the view image of each of the views V1~V2n can be 1/n of the image display 3300, which can improve the poor resolution of the spatial multiplexed 3D display according to the prior art based on those depicted in FIG. 5A. Furthermore, the refreshing frequency of the image display 3300 according to the present embodiment is twice of the refreshing frequency of the 3D image for displaying the view images at 2n views, which is significantly less than the refreshing frequency required by the temporal multiplexed 3D display according to the prior art based on those depicted in FIG. 5B. Accordingly, the driving burden of the hybrid multiplexed 3D display can be reduced.

In the above embodiments as shown in FIG. 10 and FIG. 11, the view images of one view group are simultaneously displayed and thus are separated from one another. Once the interval between two view images of the same view group is large, the 3D image viewed by the user may be not continuous and thus the user would have uncomfortable visual feeling. For alleviating the situation, the views of different view groups can be partially overlapped as shown in FIG. 13 by modifying the display condition of the hybrid multiplexed 3D display 3000.

Figure 13:
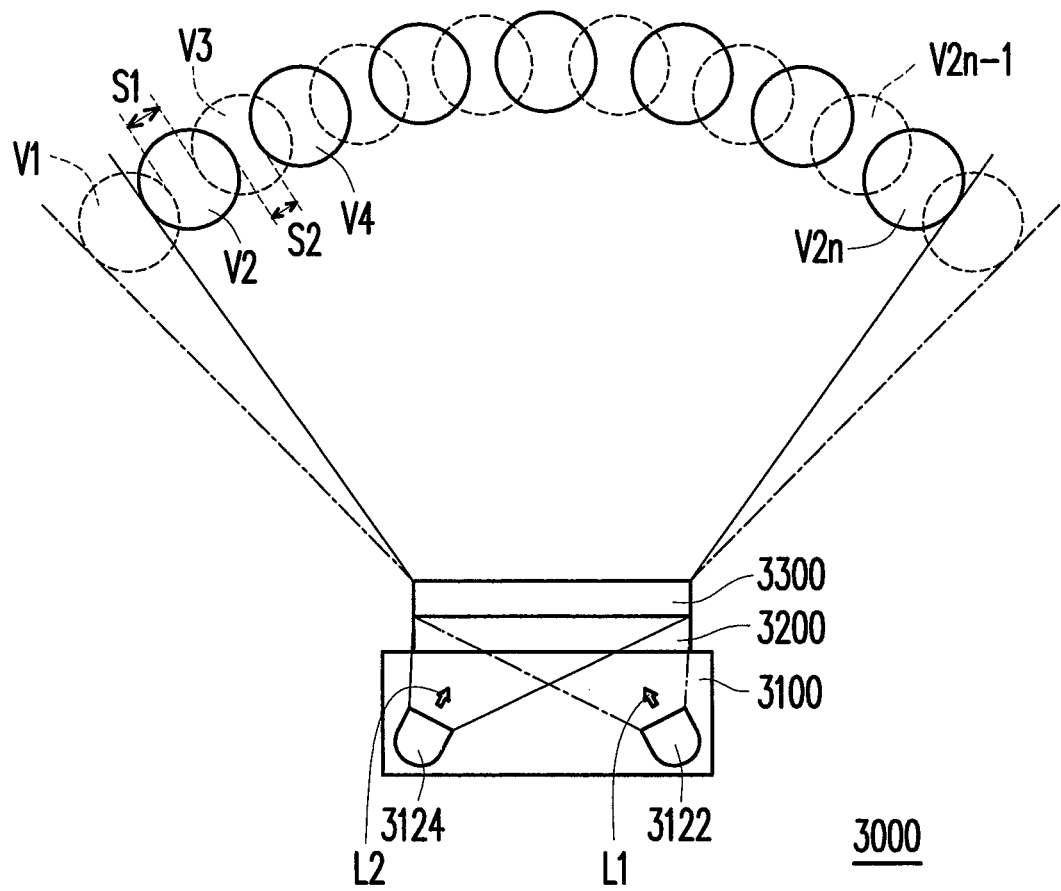
FIG. 13 is a schematic illustration showing a hybrid multiplexed 3D display according to still another embodiment of the disclosure.

FIG. 13 is a schematic illustration showing a hybrid multiplexed 3D display according to still another embodiment of the disclosure. Referring to FIG. 13, in the present embodiment, the views V1, V3 . . . V2n−1 of the first view group are defined by the first group of light L1 emitted from the directional light emitting device 3122 transmits through the image display 3300 and the image splitter 3200. The views V2, V4 . . . V2n of the second view group are defined by the second group of light L2 emitted from the directional light emitting device 3124 transmits through the image display 3300 and the image splitter 3200. Herein, one of the views V2, V4 . . . V2n in the second view group is interposed between two closely adjacent views V1, V3 . . . V2n−1 in the first view group and thus 2n views V1~V2n can be provided in the present embodiment.

It is noted that the interval S1 between two closely adjacent views V1, V3 . . . V2n−1 as well as the interval S2 between two closely adjacent views V2, V4 . . . V2n is narrower than the width of each view V1~V2n. Therefore, the views V1, V3 . . . V2n−1 of the first view group can be partially overlapped with the views V2, V4 . . . V2n of the second group, which is conducive to enhance the display quality of the hybrid multiplexed 3D display 3000 because the view images at different viewing angles can be continuous so as to provide a more vivid visual effect.

Figure 14:
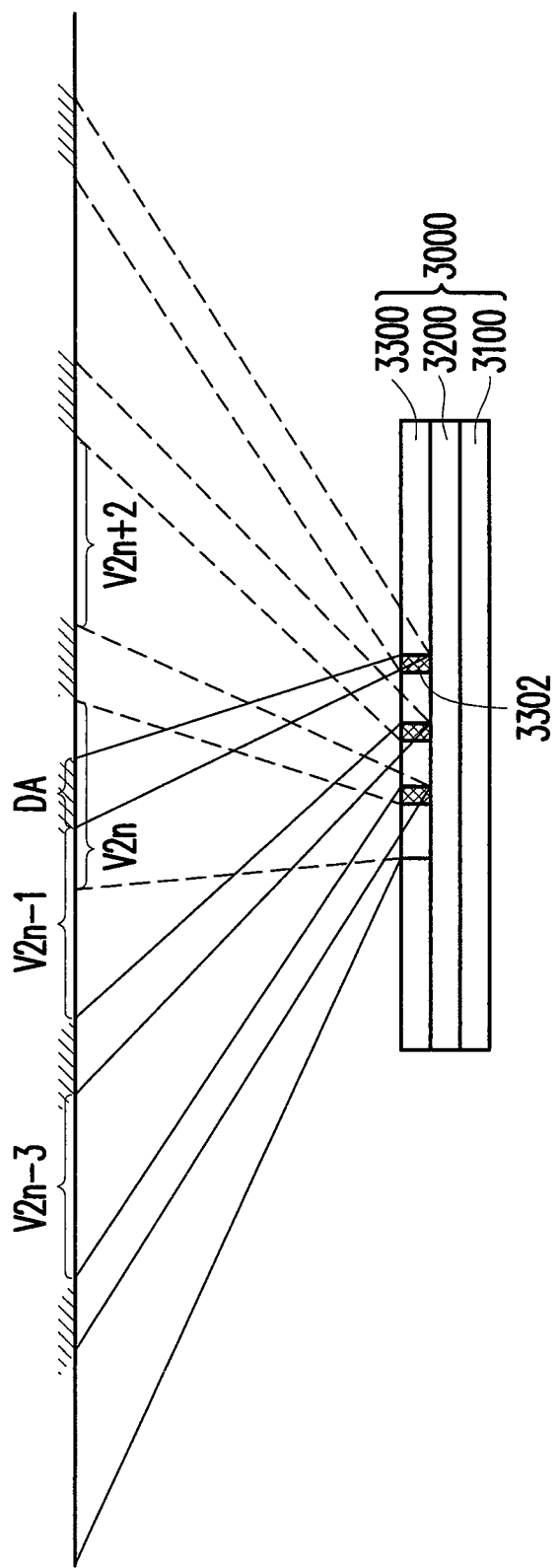
FIG. 14 schematically shows the display light of the hybrid multiplexed 3D display of FIG. 13.

Specifically, FIG. 14 schematically shows the display light of the hybrid multiplexed 3D display of FIG. 13. Referring to FIG. 13 and FIG. 14 together, for providing the required images at the views V1~V2n, the image display 3300 has a least one opaque zone 3302 during displaying images. Accordingly, two adjacent view images of the view V2n−1 and V2n−3 belonging to the first view group can be separated by at least one dead-view zone DA corresponding to the opaque zone 3302 as well as two adjacent view images of the view V2n and V2n+2 belonging to the second view group.

When the first group of light L1 is independently provided, no display light is achieved at the dead-view zone DA, which means the dead-zone DA is a non-display zone and negatively influences the display brightness (or the display aperture). In the present embodiment, the two closely adjacent views V2n and V2n−1 belonging to different view groups are partially overlapped. The view image of the view V2n of the second view group is partially located at the dead-view zone DA. Therefore, the dead-view zone DA generated during the lighting duration of the first group of light L1 can be a display zone generated during the lighting duration of the second group of light L2. The displayed view images can be continuous and thus the user can feel comfortable when seeing the 3D images displayed by the hybrid multiplexed 3D display 3000.

It is noted that the design of the hybrid multiplexed 3D display 3000 having two directional light emitting devices 3122 and 3124 is merely taken as an example, and the numbers of the directional light emitting devices can be more than two for defining more view groups in other embodiments in which different view groups can be partially overlapped for achieving better 3D display quality.

The hybrid multiplexed 3D display according to the embodiment of the invention may have the following characteristics. Compared with the conventional spatial multiplexed 3D display, the hybrid multiplexed 3D display of this invention may have the higher single view resolution, or the number of views that may be split by the image splitter is greater so that the display has more views. Thus, the 3D image quality can be enhanced. Furthermore, adjusting the pixel size and reducing the non-emissive region can increase the aperture ratio of the pixel and increase the brightness.

When the resolution of the single view is increased, the optical interference between the image display and the image splitter may be effectively reduced. When the number of views is increased, the motion parallax can be modulated more easily and the viewer can view the image in the correct view more easily. Thus, the viewing quality can be effectively enhanced.

In addition, the pixel of the display panel of the invention may greatly increase the brightness of the display panel without any color filter. Furthermore, the hybrid multiplexed 3D display of the invention can achieve autostereoscopic display having the high spatial resolution and the signal frequency that is not too high without the use of the viewer tracking system so that the product competitiveness thereof is very high. More particularly, compared with the conventional spatial multiplexed 3D display, the invention may be implemented in a super multi-view 3D display/hologram-like 3D display more easily.

In summary, the hybrid multiplexed 3D display at least can have enhanced display brightness, have better display quality (better display brightness) at large viewing angle, have reduced motion parallax owing to the increased numbers of the views, have improved resolution than the conventional spatial multiplexed 3D display by the combination of the temporal multiplexed light source and the spatial multiplexed images, and have reduced (or no) dead view zones for achieving comfortable visual effect.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hybrid multiplexed 3D display, comprising:
    a light source for sequentially providing a plurality of groups of light emitting toward different emitting directions, wherein the light source comprises a plurality of directional light emitting devices and the directional light emitting devices having different main emitting directions emit the plurality of groups of light sequentially;
    an image splitter disposed above the light source for transmitting each of the groups of light to a view group comprising N views respectively distributed in N positions, wherein N is an integer greater than 2 and at least one view of one view group is partially overlapped with at least one view of another view group; and
    an image display disposed above the light source for providing image data and the groups of light being sequentially transmitted through the image display and the image splitter to respectively generate a plurality of different view images at the N views such that an image viewed by a user comprises two of the view images to achieve a stereoscopic visual effect, wherein the plurality of different view images are displayed simultaneously at the N views distributed side by side substantially in the space.

2. The display according to claim 1, wherein the directional light emitting devices comprises a plurality of light emitting diodes.

3. The display according to claim 1, further comprising a synchronizing controller connecting to the image display and the light source for synchronizing images displayed by the image display and the groups of light providing by the light source.

4. The display according to claim 1, wherein each of the groups of light comprising light of multiple colors sequentially provided.

5. The display according to claim 4, wherein the image display is a transmissive display panel having a plurality of pixels for generating colorless images, the light of the colors is sequentially transmitted through the pixels to sequentially generate a plurality of sub-view images of the colors, and the sub-view images of the colors form the view images of the colors viewed by the user.

6. The display according to claim 5, wherein the transmissive display panel is a transmissive liquid crystal display panel or a transmissive electro-optic modulator capable of modulating light intensity.

7. The display according to claim 4, wherein and the light source comprises a plurality of sequential directional light emitting devices and each sequential directional light emitting device sequentially generates the light of the colors to form one of the groups of light.

8. A method of displaying a hybrid multiplexed 3D image, the method comprising the steps of:
    sequentially providing a plurality of groups of light emitting toward different emitting directions by a light source, wherein the light source comprises a plurality of directional light emitting devices and the directional light emitting devices having different main emitting directions emit the plurality of groups of light sequentially;
    transmitting each of the groups of light to a view group comprising N views respectively distributed in N positions by an image splitter, wherein N is an integer greater than 2 and at least one of the views that one group of light emit toward is partially overlapped with at least one of the views that another group of light emit toward; and
    providing image data by an image display and the groups of light being sequentially transmitted through the image display and the image splitter to respectively generate a plurality of different view images at the N views such that an image viewed by a user comprises two of the view images to achieve a stereoscopic visual effect, wherein the plurality of different view images are displayed simultaneously at the N views distributed side by side substantially in the space.

9. The method according to claim 8, further comprising synchronizing, by a synchronizing controller connecting to the image display and the light source, images displayed by the image display and the groups of light providing by the light source.

10. The method according to claim 8, wherein the method of providing, by the light source, each of the plurality of groups of light comprises sequentially generating light of multiple colors.

11. The method according to claim 10, wherein the image display is a transmissive display panel having a plurality of pixels for generating colorless images, the light of the colors is sequentially transmitted through the pixels to sequentially generate a plurality of sub-view images of the colors, and the sub-view images of the colors form the view images of the colors viewed by the user.

* * * * *